United States Patent
Fujita et al.

(10) Patent No.: US 6,886,024 B1
(45) Date of Patent: Apr. 26, 2005

(54) DISTRIBUTED APPLICATION CONTROL SYSTEM, CONTROL METHOD AND A PROGRAM

(75) Inventors: Satoru Fujita, Tokyo (JP); Kazuya Koyama, Tokyo (JP)

(73) Assignee: NEC Corporation, Tokyo (JP)

(*) Notice: Subject to any disclaimer, the term of this patent is extended or adjusted under 35 U.S.C. 154(b) by 724 days.

(21) Appl. No.: 09/695,195

(22) Filed: Oct. 25, 2000

(30) Foreign Application Priority Data

Oct. 26, 1999 (JP) .......................................... 11-304681

(51) Int. Cl.[7] .............................................. G06F 13/00
(52) U.S. Cl. ................................. 709/201; 709/304
(58) Field of Search ................................ 709/300, 302, 709/304, 305

(56) References Cited

U.S. PATENT DOCUMENTS

| | | | | |
|---|---|---|---|---|
| 5,603,031 A | * | 2/1997 | White et al. | 709/317 |
| 5,953,514 A | * | 9/1999 | Gochee | 717/138 |
| 6,016,393 A | * | 1/2000 | White et al. | 709/315 |
| 6,049,819 A | * | 4/2000 | Buckle et al. | 709/202 |
| 6,085,222 A | * | 7/2000 | Fujino et al. | 709/202 |
| 6,092,099 A | * | 7/2000 | Irie et al. | 709/202 |
| 6,115,736 A | * | 9/2000 | Devarakonda et al. | 709/202 |
| 6,148,327 A | * | 11/2000 | Whitebread et al. | 709/202 |
| 6,163,794 A | * | 12/2000 | Lange et al. | 709/202 |
| 6,192,402 B1 | * | 2/2001 | Iwase | 709/223 |
| 6,282,563 B1 | * | 8/2001 | Yamamoto et al. | 709/202 |
| 6,343,311 B1 | * | 1/2002 | Nishida et al. | 709/203 |
| 6,356,964 B1 | * | 3/2002 | Mohindra et al. | 710/100 |
| 6,496,871 B1 | | 12/2002 | Jagannathan et al. | |
| 6,539,416 B1 | * | 3/2003 | Takewaki et al. | 709/202 |
| 6,681,243 B1 | * | 1/2004 | Putzolu et al. | 709/202 |

FOREIGN PATENT DOCUMENTS

JP    2000-20487 A    1/2000

OTHER PUBLICATIONS

Stevens, W. Richard, "UNIX Network Programming", Prentice–hall, 1990, pp. 562–587.*
Cockayne, William et al., "Mobile Agents", Manning Publications Co., 1997, pp. 58–95.*

(Continued)

*Primary Examiner*—Moustafa M. Meky
(74) *Attorney, Agent, or Firm*—Foley & Lardner LLP

(57) ABSTRACT

A system in which execution of plural applications distributed over plural computers is controlled using a simplified script language to realize coordination among plural applications to enable facilitated construction of upper-order distributed applications. Each computer includes, on an agent platform 2, an agent base 9 capable of having a shell agent 10, a local service agent 11 and an application agent 12, an agent movement unit 13, thread generating unit 14, remote control unit 15 and agent generating unit 16. A script language input through an input unit 7 is interpreted by the shell agent 10 to boot the application agent 12. The application agent supervises an actual application 18. The shell agent and the application agent can be moved to another computer using the agent movement unit 13 and can have communication with an agent in the other computer with the aid of the remote control unit 15.

31 Claims, 28 Drawing Sheets

OTHER PUBLICATIONS

Satoru Fujita, "Mobile Agent Programming Using Mobidget," NEC Technical Reports, vol. 52, No. 4, p. 53–56, NEC Corporation, Apr. 23, 1999 (CS-NH-2000-00019-003).

Hideki Dai, "The Current State of Mobile Agent Technology, and Issues for the Future," Computer Software, vol. 16, No. 5, p. 2–13, Japan Society for Software Science and Technology, Sep. 16, 1999 (CS-ND-2000-01297-001).

Fumio Hattori, "Agent Language," Computer Software, vol. 14, No. 4, p. 3–12, Japan Software Materials Association, Jul. 15, 1997 (CS-ND-1997, 00102-001).

Satoru Fujita, et al., "The Mobile Distributed Programming Language Mobidget: Language Specifications," Compendium (1) of the 57th (2nd half, 1998) National Conference, p. 1–301–1–302, 5U–1, Information Processing Society of Japan, Oct. 5, 1998.

Kazuya Koyama, et al., "Creating the Mobidget Mobile Distributed Bases," Compendium (1) of the 57th (2nd half, 1998) National Conference, p. 1–303–1–304, 5U–2, Information Processing Society of Japan, Oct. 5, 1998.

Hidehito Gomi, et al., "Mobidget Distributed Object Control," Compendium (1) of the 57th (2nd half, 1998) National Conference, p. 1–305–1–306, 5U–3, Information Processing Society of Japan, Oct. 5, 1998.

Chihiro Komatsu, et al.: "A cyclical search system for Mobidget," Compendium (1) of the 57th (2nd half, 1998) National Conference, p. 1–307–1–308, 5U–4, Information Processing Society of Japan, Oct. 5, 1998.

Stevens, W. Richard, "UNIX Network Programming", Prentice–Hall, 1990, pp. 562–587.

Cockayne, William et al., "Mobile Agents", Manning Publications Co., 1997, pp. 58–95.

* cited by examiner

FIG. 8

AGENT REFERENCING TABLE — 26

| AGENT VARIABLE NAME | EXTERNAL AGENT |
|---|---|
| agent-0 | |
| agent-1 | |
| ... | |
| agent-n | |

44 — AGENT VARIABLE NAME
45 — EXTERNAL AGENT
46

DISTRIBUTED APPLICATION CONTROL SYSTEM, CONTROL METHOD AND A PROGRAM

FIELD OF THE INVENTION

This invention relates to an information processing system and, more particularly, to a distributed application control system, employing an agent, a control method and a program product carryable by a recording medium.

As will be apparent from the following explanation, the present invention relates to a technique applied with advantage to a distributed application control system in which plural files distributed in plural computers are supervised in a unified or systematic directory and in which a movable control agent system moves or communicates an application agent supervising an application executing services supplied by each file to a computer where there exists the pertinent file, to execute a script to execute application control.

BACKGROUND OF THE INVENTION

For example, the NFS (Network File System) of Sun Microsystems Inc. provides such a system for plural computers interconnected over a network, in which, in a well-known manner, a file system of a remote computer is caused to appear as if it is a local computer file system for a directory supervision so that the computer can access a file of the remote computer in the same way as the local file system. However, the file is processed by a local computer, such that file processing cannot be carried out on the remote computer.

Moreover, a remote shell mounted on a UNIX system is a script language configured for executing commands on a remote computer, as described in Document 1 (Unix Network Programming, W. Richard Stevens, Prentice-Hall, 1990). In this script language, the executing computer is specified and the command specified by the script is executed on the specified computer, providing, however, that one script is interpreted on only one computer.

For executing the command on plural computers, there is no alternative but to provide plural scripts each designating a computer for execution, and to invoke the plural scripts sequentially as remote shells in association with each of the plural computers.

As a technique for continuing execution across or over plural computers, there is known a movable agent system.

For example, in a telescript technology of General Magic Inc., USA, an agent moves among different computers under a "go" command, as described in Document 2 (Publication of JP Patent Kokai JP-A-7-182174. In order for an agent to have communication with another agent, the agent needs to be moved at the outset to a special site called a "place" where a counterpart agent exists. In other words, communication is possible only between agents existing in the same place. Although the telescript technique features the itineration across plural computers to receive services, it suffers a drawback that place management needs to be performed separately from service management and that one agent cannot access plural computers in parallel.

The "Agent Tcl", also called "D'Agent", disclosed in Document 3 ("William Cockayne and Michael Zyda, Mobile Agent, Manning Publications Co., 1997"), is a mobile agent developed by Dartmouth University, USA. This mobile agent is based on a shell script language, called "Tcl" (Tool Command Language), to which is added a movement function by an "agent_jump" command. This "Tcl" can be utilized as a simple shell and represents a shell script language that can be used more readily by a user than the program language exemplified by telescript.

However, even in the "Agent Tcl", agent movement across the computers is performed by a movement command and supervised by a directory separate from the directory for the resources in the computer. The computer and the resources in the computer are supervised by separate directories, such that a management of the movement command is independent of a management of the computer resources.

On the other hand, since an agent can exist only in one computer, the resources of plural computers cannot be handled in parallel.

In, e.g., Document 4 (JP Patent Kokai JP-A-10-149287), there is disclosed a mobile agent system of the predicate logic type in which an action of the script language for causing the agent movement by a [go to] command can be stated as a predicate.

In the system described in Document 4, the script language can describe the agent movement, however, it cannot supervise the directory together with the resources furnished by the computer. Moreover, similarly to other mobile agent languages, the script language can not access the resources of plural computers in parallel.

In, e.g., unpublished Document 5 (JP Patent Application No. 11-047015, not published as of the filing date of the present Japanese application, now Kokai Publication JP-P2000-244426A published Sep. 8, 2000), there is described a system which not only has an agent movement command and is able to move a program being executed to different computers but also has a function of permitting an agent to perform execution in parallel across plural computers such that a program unifies services present in distribution across plural computers to supervise the services in a distributed and synchronous fashion to provide a service over a network. However, commands for movement and management of the computer resources are performed independently of each other, such that a user cannot easily access computer resources distributed over the network. However, there is much to be desired in this system, likewise other techniques disclosed by the published documents.

SUMMARY OF THE DISCLOSURE

In the course of eager investigations towards the present invention, it has turned out that the techniques described in the above published documents suffer the following problems.

A first problem is that the above-described techniques fail to provide a control environment in which plural remote computers and the resources furnished by these remote computers are supervised by a simplified directory structure and in which the directory is moved to generate an agent supervising the resources in a site where there exist these resources to enable interactive control of resources.

The reason is that a system not employing a mobile agent lacks in a function of facilitated movement across plural computers such that an agent for managing the resources cannot be prepared on a remote computer.

If the system utilizes a mobile agent, limitations may be imposed on communication with remote computers, or movement across different computers and the directory management of the computer resources are managed separately.

The second problem is that, in a conventional mobile agent system, means for sequentially controlling services presented by plural remote computers from a control agent and means for distributedly and synchronously controlling the services cannot be provided together or simultaneously.

The reason is that the mobile agent systems described in the above-mentioned several published documents are provided with a function of sequentially itinerating through plural computers, however, are not provided with a function of having plural services controlled by an agent existing in a distributed fashion across plural computers.

If an agent system is provided with a function for movement and a function for distribution, it is targeted to construct a program language for developing an agent system, whereas it is not targeted to provide a script language aimed at permitting facilitated combination of sequential control and distributed control by a user.

In view of these problems, it is an aspect of the present invention to provide a system, method and program product for readily controlling, through use of a script language, the generation, movement and the end of an agent, configured for supervising resources on plural computers, by a user interactive environment.

It is another aspect of the present invention to provide a system, method and program product in which a system for controlling an agent on a remote controller is provided with a movement function and a distribution function and in which computer movement and management of resources are caused to appear as a sole directory structure to the user, whereby even a user not well versed in computer networks is able to readily state by a script language an agent realizing a unified service in need of the movement function and the distribution function.

Other aspects, objects, features and advantages of the present invention will become apparent to those skilled in the art from the following description and the claims.

According to an aspect of the present invention, there is provided a system comprising a shell agent responsive to an input of a script language configured for controlling distributed application to interpret and execute the script language, a local service agent furnishing information of a local file system to a computer, and an application agent directly controlling the application, an agent base furnishing respective fields of execution to the shell agent, the local service agent and the application agent. The system further comprises agent mover for causing movement of an agent to an agent base of at least one other computer, remote call module for furnishing a function for an agent to have communication with an agent of an own computer or at least one other computer, and agent generator for generating an application agent. The execution of the application distributed over each computer is controlled responsive to an input of the script language.

According to a second aspect of the present invention, there is provided a distributed application control method in which a shell agent in each agent platform of each computer interprets and executes a script language input to control the distributed application, a local service agent furnishes information pertinent to a local file system to a computer, and an application agent directly controls the application. An agent base furnishes respective fields of execution for the shell agent, the local service agent and the application agent. An agent is movable to at least one other agent base of at least one other computer (through an agent movement mechanism). The agent has communication with an own computer or at least one other computer through a remote call function. The shell agent interprets the input script language to control the generation of the application agent through an agent generating function. The execution of the distributed applications in the computers is controlled responsive to inputting of the script language.

BRIEF DESCRIPTION OF THE DRAWINGS

FIG. 8 shows an illustrative structure of an agent referencing table according to an embodiment of the present invention.

PREFERRED EMBODIMENTS OF THE INVENTION

A preferred embodiment of the present invention is hereinafter explained. In a distributed application control system, according to an embodiment of the present invention, a shell agent interpreting the script language moves itself or has communication with an agent platform of at least one remote computer to enable the application distributed over plural computers to be controlled by a sole script.

Figure 2:
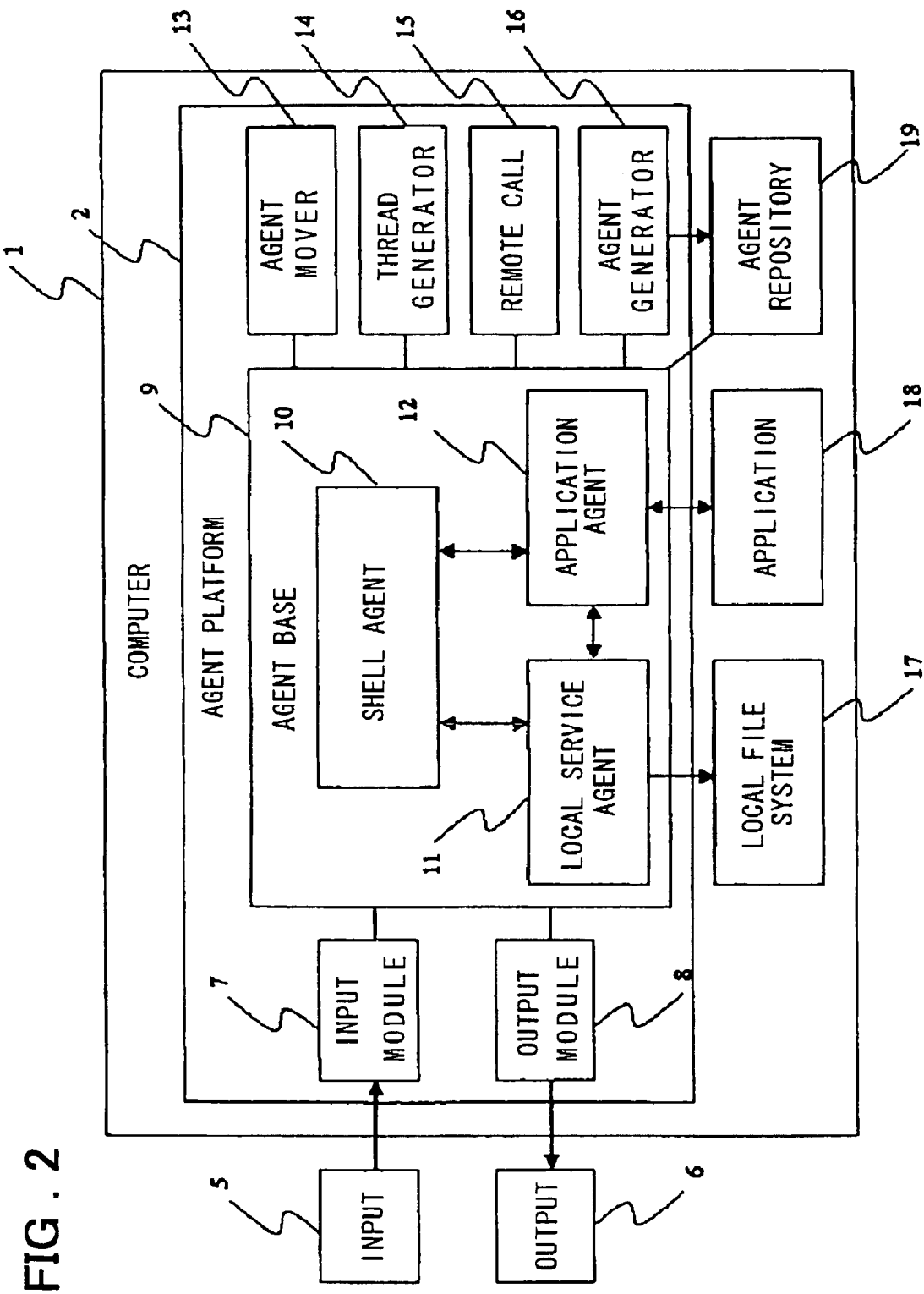
FIG. 2 shows an agent platform according to an embodiment of the present invention.

More specifically, Referring to FIG. 2, each computer has agent platform (2). The agent platform has an agent base (9), agent movement module (mover) (13) for furnishing the function of causing the movement of an agent to an agent base of another computer, remote call module (15) for furnishing the functions for an agent to have communication with an agent of an own computer or at least one other computer, and agent generating module (agent generator 16) for generating an application agent. The agent base includes a shell agent (10) responsive to an input of a script language configured for controlling the distributed application to interpret and execute the script language, a local service agent (11) for furnishing information of a local file system to the computer, and an application agent (12) for directly controlling the application (18). The script language input through an input module (7) is interpreted by the shell agent (10) to boot the application agent (12) which supervises an actual application (18). The shell agent and the application agent are movable through agent mover (13) to at least one other computer and is able to have communication with the other computer or computers using remote caller (15).

Figure 3:
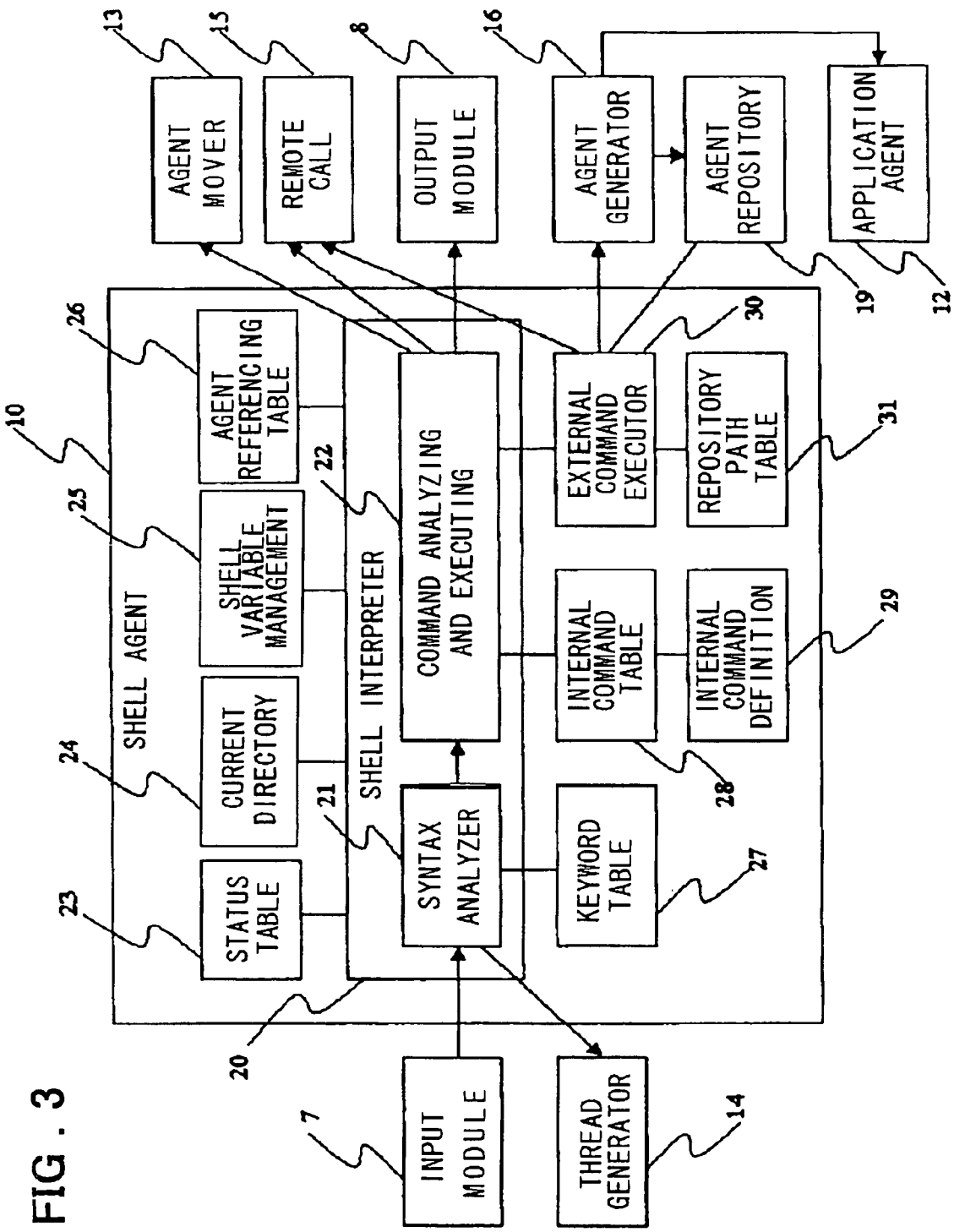
FIG. 3 shows an illustrative structure of a shell agent according to an embodiment of the present invention.

The shell agent includes a shell interpreter (20 of FIG. 3) and a current directory (24 of FIG. 3).

The shell agent includes a repository path table (31 of FIG. 3) and retrieves the application agent from the repository path table to execute a retrieved application agent.

For generating an application agent at remote computer by the shell agent, there is provided means (module 30 of FIG. 4) invoking a local service agent (11 of FIG. 4) assisting in accessing resources local to the respective computers. When generating the application agent, the shell agent generates the application agent through the local service agent (11) without directly invoking the agent generating module (agent generator 16).

In an alternative embodiment of the present invention, a shell interpreter interprets a keyword [parallel] and generates a thread and a sub-shell agent to the remote computer or computers in order to execute plural commands in parallel. The sub-shell agent causes the actual application agent to be executed by the remote computer.

Figure 18:
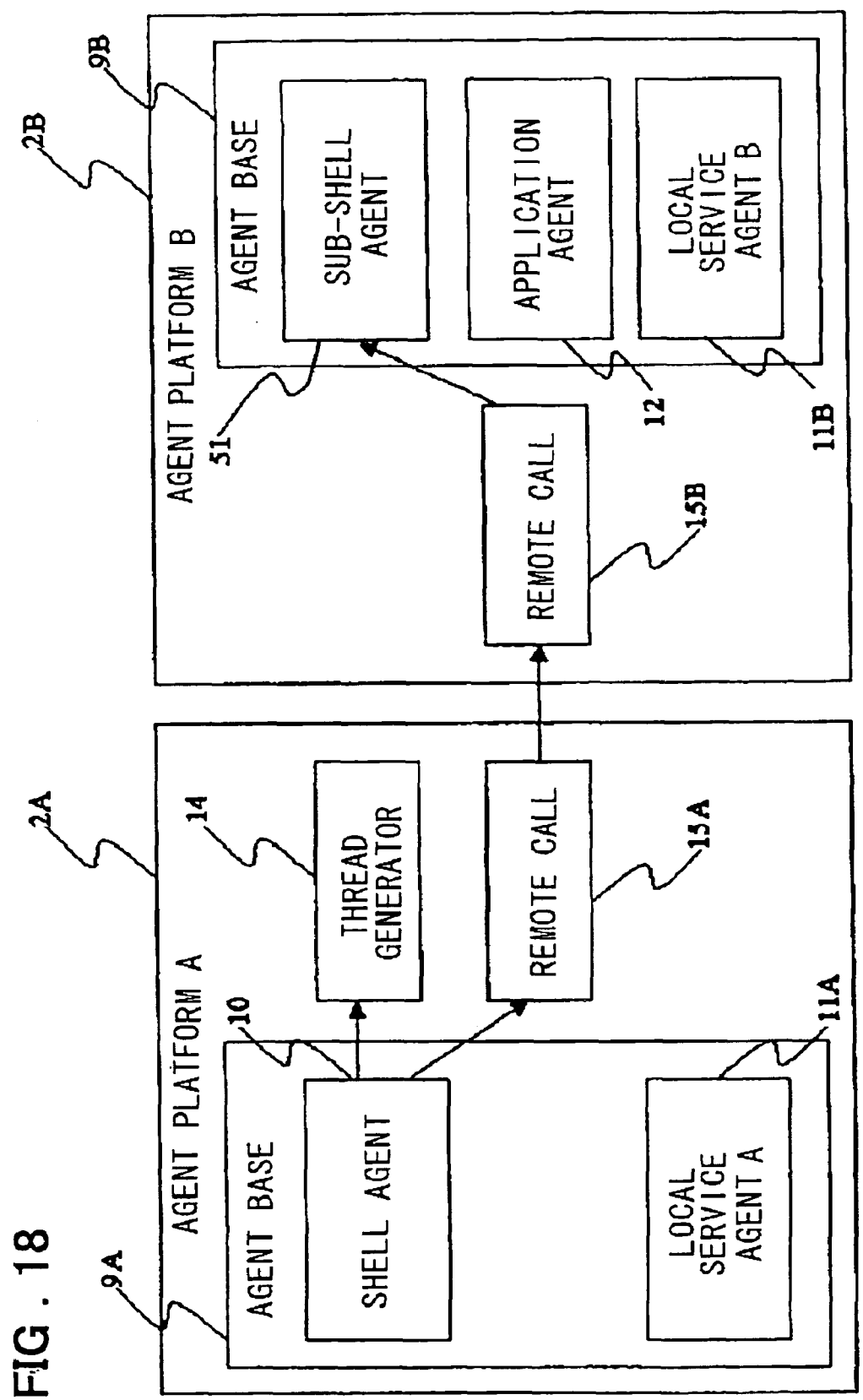
FIG. 18 illustrates a flowchart showing a first example of parallel execution according to an embodiment of the present invention.

More specifically, the shell interpreter (20 of FIG. 3) includes syntax analyzing module (syntax analyzer 21 of FIG. 3) and causes the remote computer to generate a sub-shell agent (51 of FIG. 18) using thread generator (14 of FIG. 3) and remote caller (15 of FIG. 18).

If there is a syntax specifying parallel execution ([parallel sentence]) in the input script language, as many threads as necessary in executing the script language are generated to control the parallel execution of the application.

The shell agent includes a status table (23 of FIG. 3) for supervising the status of the agent. The status table includes parallel execution counts of the agent and a terminal execution flag. If the current base of the current directory is a remote computer, and the status of the agent is not the parallel executing state nor the terminal executing mode, the shell agent is moved to the remote computer or computers.

When the agent platform generates an application agent in a remote computer by the generated thread, there is a sub-shell agent in the agent base in the remote computer to take over the generation of the application agent.

In another embodiment of the present invention, the application agent booted executes a specified application program dependent on the computer or employs a general-purpose application agent to selectively execute an application depending on the file.

Figure 24:
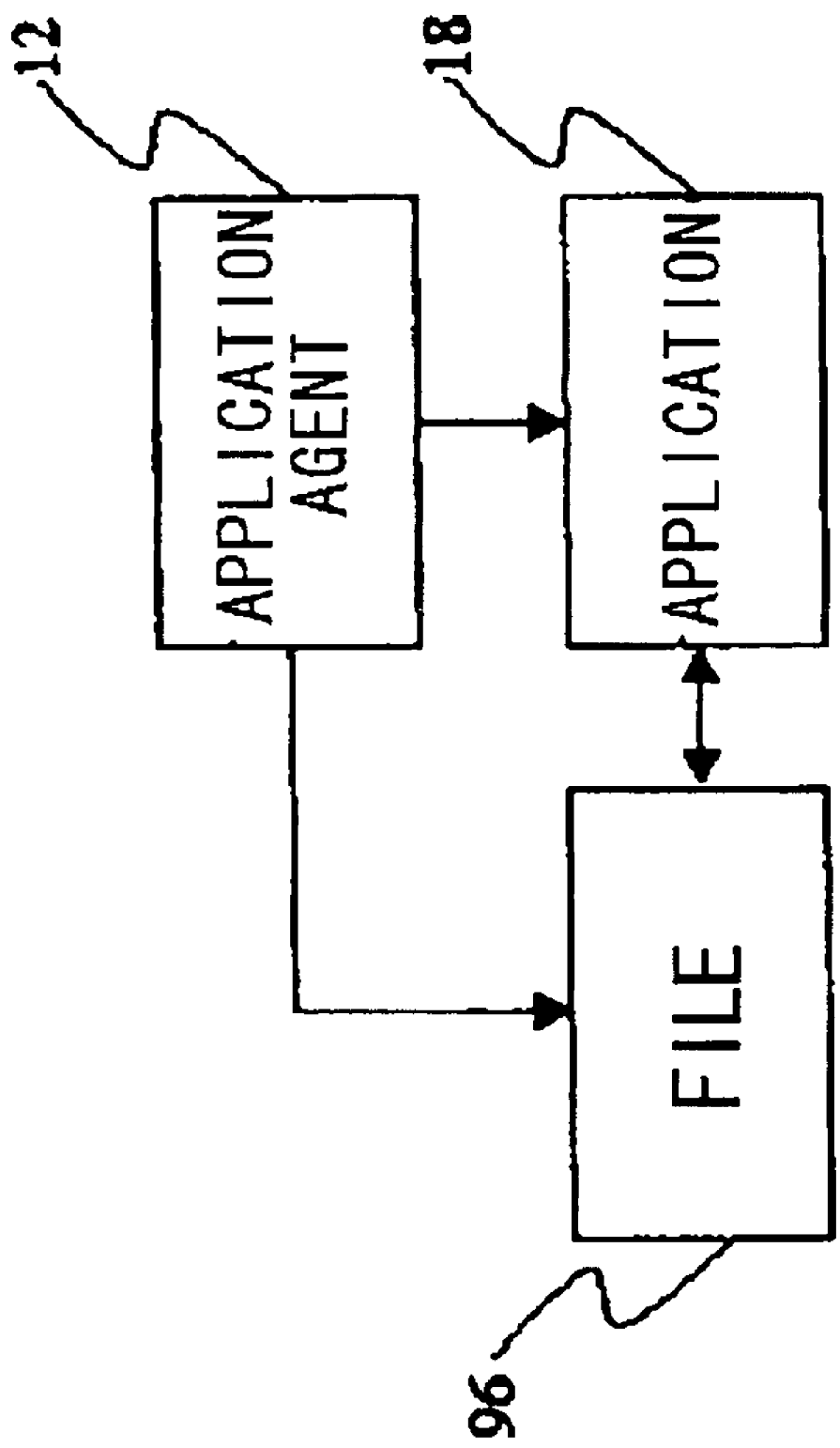
FIG. 24 shows an illustrative relation between an application agent and an application according to an embodiment of the present invention.
Figure 25:
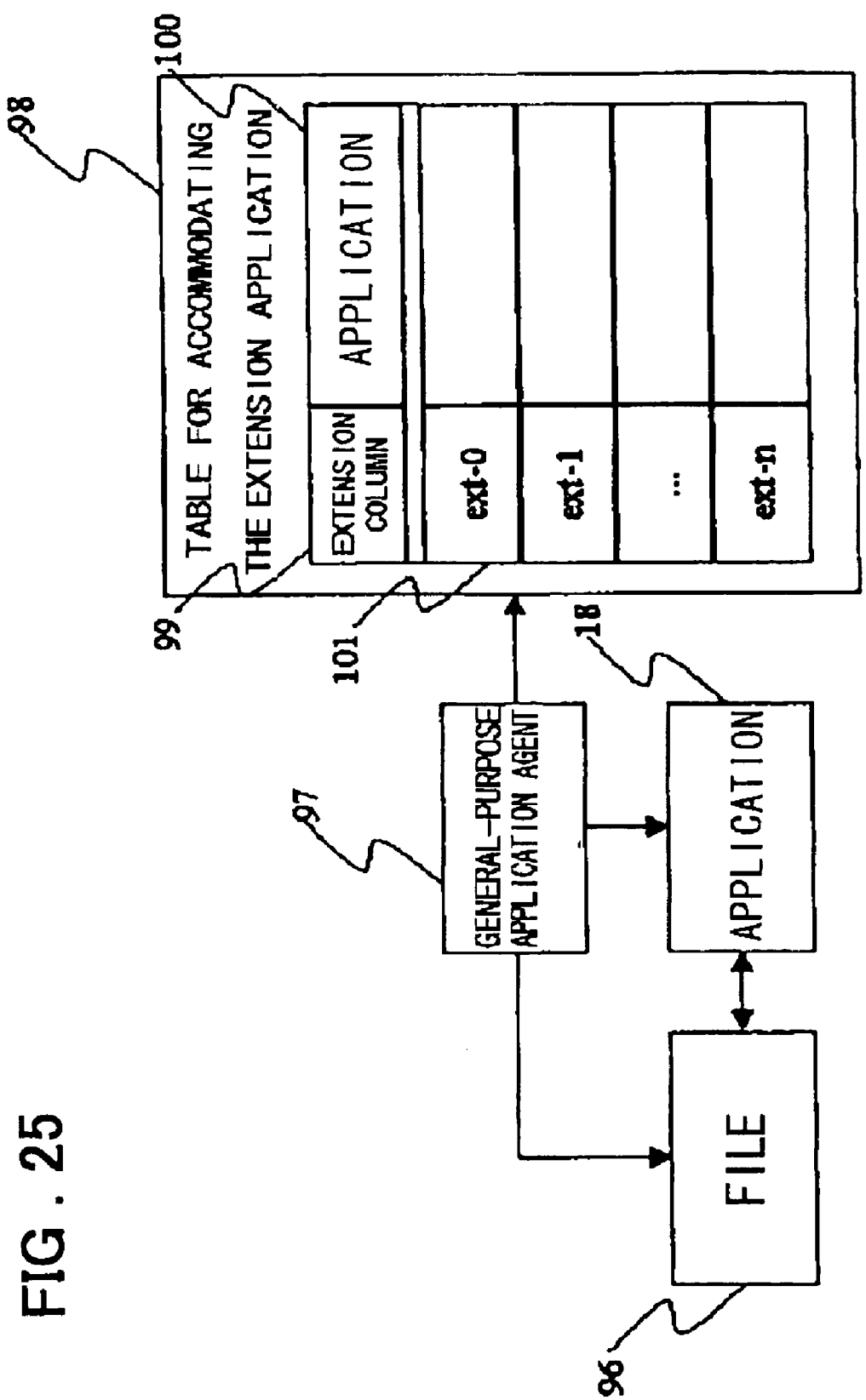
FIG. 25 shows an example of the relation between a general-purpose application agent and the application according to an embodiment of the present invention.

More specifically, the application agent (12 of FIG. 24) is associated with a specified application (18 of FIG. 24) or an extension application accommodating table (98 of FIG. 25) is used as a general-purpose application agent (97 of FIG. 25) to determine the application (18 of FIG. 25).

The shell interpreter (20 of FIG. 3) of the shell agent references the information of the current directory (24 of FIG. 3) to interpret and execute the script language and invokes the agent generator (16 of FIG. 3) for generating an application agent configured for directly controlling the application and remote call module (15 of FIG. 3) configured in turn for causing movement of the shell agent itself by the agent mover (13 of FIG. 3) and providing for communication with the remote computer as necessary.

The application agent executes the file to be executed using a specified application. Alternatively, the general-purpose application agent uses the extension application accommodating table, to determine and execute the application.

Meanwhile, the functions of the shell agent, local service agent, application agent, agent mover, thread generator, remote call module, agent generator, syntax analyzer and command analyzer-executor of a shell agent can be realized by executing the program on the computer. The present invention can be practiced by loading and installing these programs from a well-known dynamic or static medium, such as a recording medium or a communication medium, through given interfacing means, and by executing the execution image.

DETAILED DESCRIPTION OF THE PREFERRED EMBODIMENTS

For explaining the above-described preferred embodiment of the present invention in more detail, the embodiments of the present invention are explained with reference to the drawings.

Figure 1:
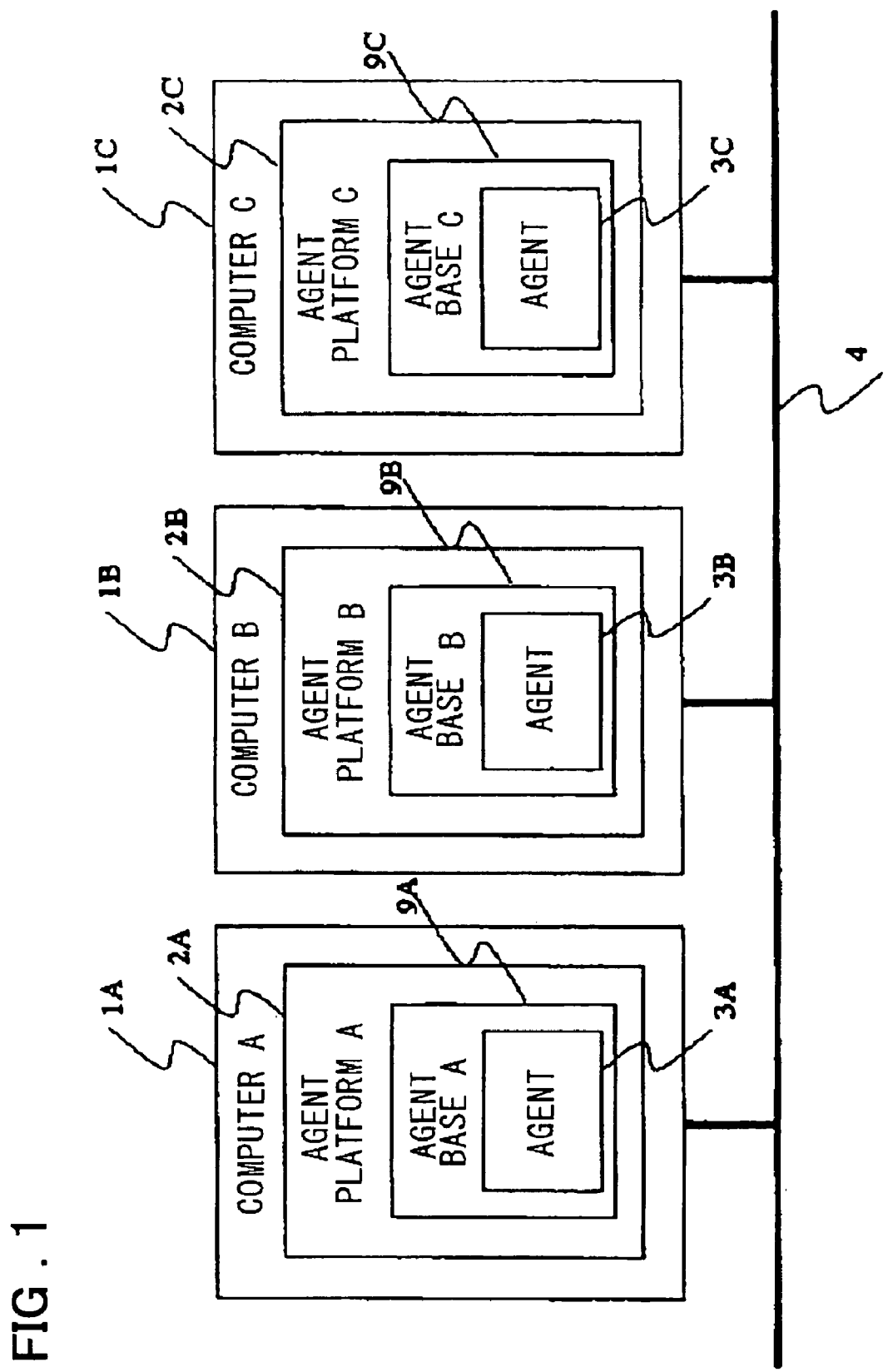
FIG. 1 shows a system configuration of an embodiment of the present invention.

FIG. 1 shows a system configuration according to an embodiment of the present invention, and illustrates a structure of a distributed processing system comprising plural computers interconnected over a network and which are configured for executing a network script language. Although FIG. 1 shows a system comprised of three computers, by way of an example, FIG. 1 and the following figures are intended for illustrating the present invention without limiting the invention. For example, the present invention is not limited to a configuration with three computers.

Referring to FIG. 1, the computers 1A to 1C are provided with agent platforms 2A to 2C, respectively. The agent platforms are provided respectively with agent bases 9A to 9C. In these agent bases 9A to 9C are provided with agents 3A to 3C, respectively.

The computers 1A to 1C are interconnected over a network 4. Using this network 4, communication between different agent platforms or between different agents or migration of the agents are performed.

FIG. 2 shows an illustrative structure of a computer executing network script language in an embodiment of the present invention.

Referring to FIG. 2, the computer 1 has an input 5 and an output 6. In addition, the computer 1 includes an agent platform 2, a local file system 17, an application 18 and an agent repository 19.

The agent platform 2 has input module 7 for receiving the input 5 to the computer 1 and output module 8 for the output 6. The agent platform 2 also includes an agent base 9 as an area in which to store a variety of running agent programs, such as a shell agent 10, a local service agent 11, or an application agent 12.

The agent platform 2 also includes agent movement module (agent mover) 13, thread generating module 14, remote call module 15 and agent generating module 16, these modules having the functions of assisting in the agent execution.

The agent movement module 13 furnishes the function of allowing an agent in the agent base 9 to migrate to another agent platform.

The thread generating module 14 furnishes the function of generating a new thread when an agent in the agent base 9 performs multi-thread operations.

The remote call module 15 furnishes the function for an agent in the agent base 9 to cause another agent in the same agent platform or an agent in another agent platform to invoke a method.

The agent generating module 16 is invoked when a new agent is generated and executed in the agent base 9. Specifically, the agent generating module 16 retrieves an agent program in the agent repository 19 and, based on the retrieved result, generates an agent in the agent base 9.

The shell agent 10 is an agent which interprets and executes a network script language and performs communication with a local service agent 11, while generating and having communication with the application agent 12.

The local service agent 11 is an agent for furnishing the information and functions proper to the computer 1. The local service agent 11 supervises the local file system 17 to furnish the information to the shell agent 10.

The application agent 12 is of two different types.

Of these, the first type of the application agent is present in the form of wrapping an exterior application 18 and acts as an intermediary when an external application 18 has communication or interaction with an agent in the agent base 9.

The second type application agent is a stand-alone as an agent in the agent base 9, without having an external application program 18, to execute a specified application.

In any case, the application agent 12 executes a specified task, on request from the shell agent 10.

The shell agent 10, local service agent 11, application agent 12, agent base 9, agent movement module 13, thread generating module 14, remote call module 15 and the agent generating module 16 get respective processings and functions executed by programs run on the computer 11. In an embodiment of the present invention, these programs are read into a computer from a recording medium, having these programs recorded therein, such as a CD-ROM, FD, DVD, magnetic tape or a removable HDD, through a readout device of the recording medium or an interface of the readout device, and an execution image of these programs is loaded in a main memory and executed by the CPU to execute the present invention. Alternatively, the programs, transmitted from a server through a cable or radio communication transmission medium, may be read into the computer through a communication device or its interface.

FIG. 3 shows an illustrative structure of the shell agent 10 in an embodiment of the present invention. Referring to FIG. 3, the shell agent 10 includes, as main constituent elements, a shell interpreter 20, which includes syntax analyzing module (syntax analyzer) 21, receiving an input of a script language from the input module 7 and analyzing the syntax of the input script language, and command analyzing and executing module 22 for analyzing and executing a command.

In analyzing the syntax of the script language, the syntax analyzing module 21 references a keyword table 27 in which are managed and registered keywords, as a keyword letter string, such as "parallel".

On reception of an input having a syntax beginning with "parallel", the syntax analyzing module 21 requests the thread generating module (thread generator) 14 to generate a new thread.

The command analyzing and executing module 22 references an internal command table 28 to verify whether or not the input command can be processed within the shell agent 10.

If, as a result of verification, the input command is the internal command, the command definition is loaded from an internal command definition module 29 for execution.

If, in executing the command for directory migration, among the internal commands loaded from the internal command definition module 29, the shell agent 10 itself needs to be executed, the command analyzing and executing module 22 invokes the agent movement module 13.

Moreover, the command analyzing and executing module 22 exploits the remote call module 15 in executing methods of other agents.

The results of execution by the command analyzing and executing module 22 are delivered to the output module 8 and are output from the computer 1.

On the other hand, the external command is executed by external command executor module 30. By the agent repository 19, the external command executor module 30 retrieves an agent program which executes the external command. For determining which path in the agent repository 19 is to be retrieved at this time, a repository path table 31 is referenced to sequentially retrieve the agent repository 19 as to paths stored in a repository path table 31.

If, as a result of retrieval of the agent repository 19, the required agent has been retrieved, the external command executor module 30 requests the agent generating module 16 to generate an agent. The agent generating module 16 is responsive to this request to generate the application agent 12.

If the external command executor module 30 is to perform a method call to an agent other than the shell agent 10, the external command executor module 30 also invokes the remote call module 15.

The shell agent 10 includes a status table 23 for managing the state of execution of the shell agent 10, a current directory 24 of the shell agent 10, a shell variable management table 25, an agent referencing table 26 for supervising a variable indicating an external agent, these tables assisting in the execution of a shell interpreter 20.

The shell variable management table 25 is a management table for facilitating statement of the script language by the shell variable. Meanwhile, the shell variable management table 25 may be omitted in the configuration of the shell agent 10 shown in FIG. 3.

Figure 4:
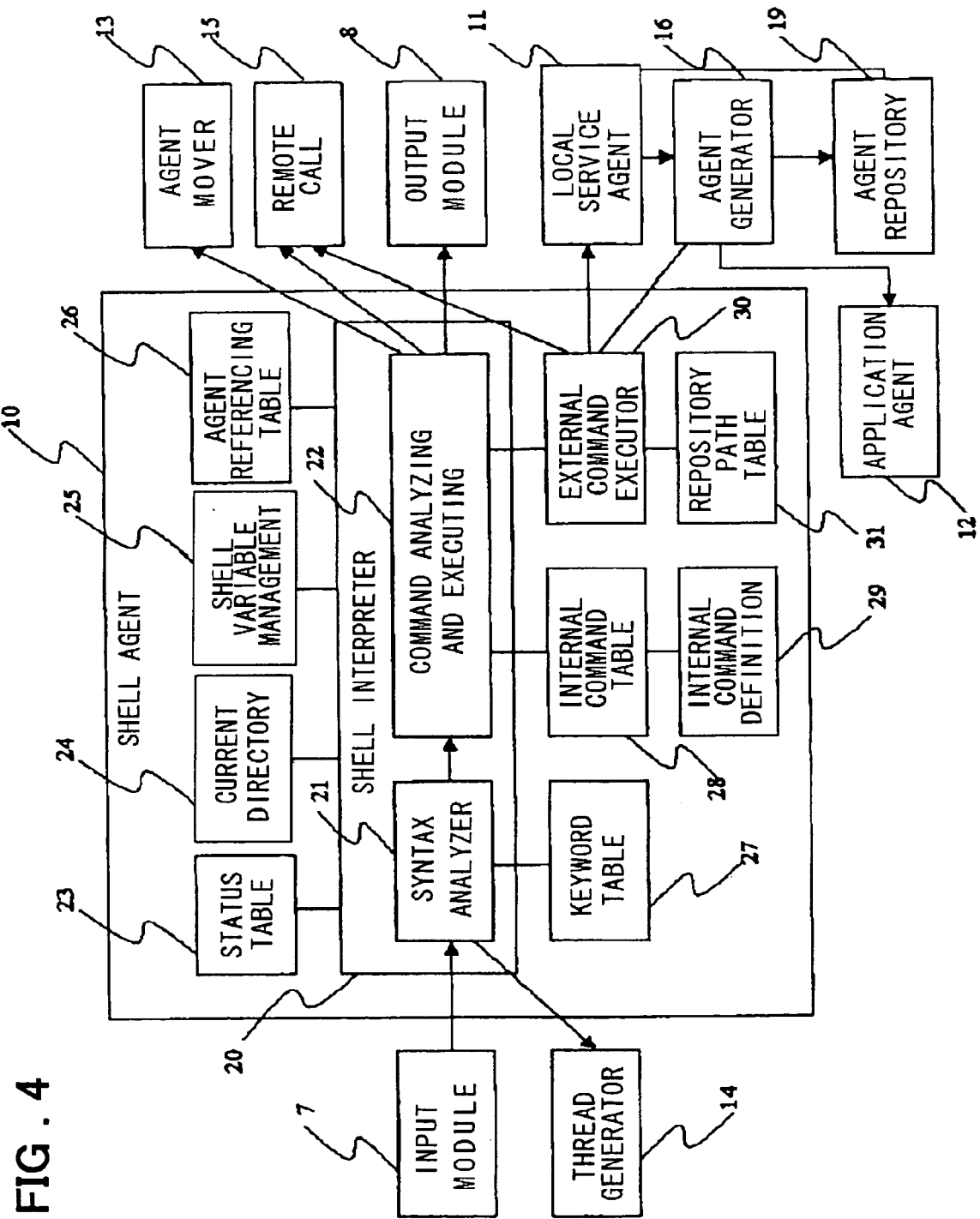
FIG. 4 shows another illustrative structure of a shell agent according to an embodiment of the present invention.

FIG. 4 shows a modification of the present invention in which elements of the shell agent 10 are configured differently from those shown in FIG. 3. In the configuration shown in FIG. 3, the external command executor module 30 directly invoke the agent generating module 16. Alternatively, this function can be entrusted to the local service agent 11.

In this case, this local service agent 11 receives the name of an external command and the bus information stored in the repository path table 31 from the external command executor module 30 to effect retrieval of the agent repository 19 and actual invoking of the agent generating module 16 to generate the application agent 12.

The processing and the function of the syntax analyzing module 21 and the command analyzing and executing module 22 of the shell interpreter 20 of the shell agent 10 and the external command executor module 30 are realized by a program executed on the computer 1.

Figure 5:
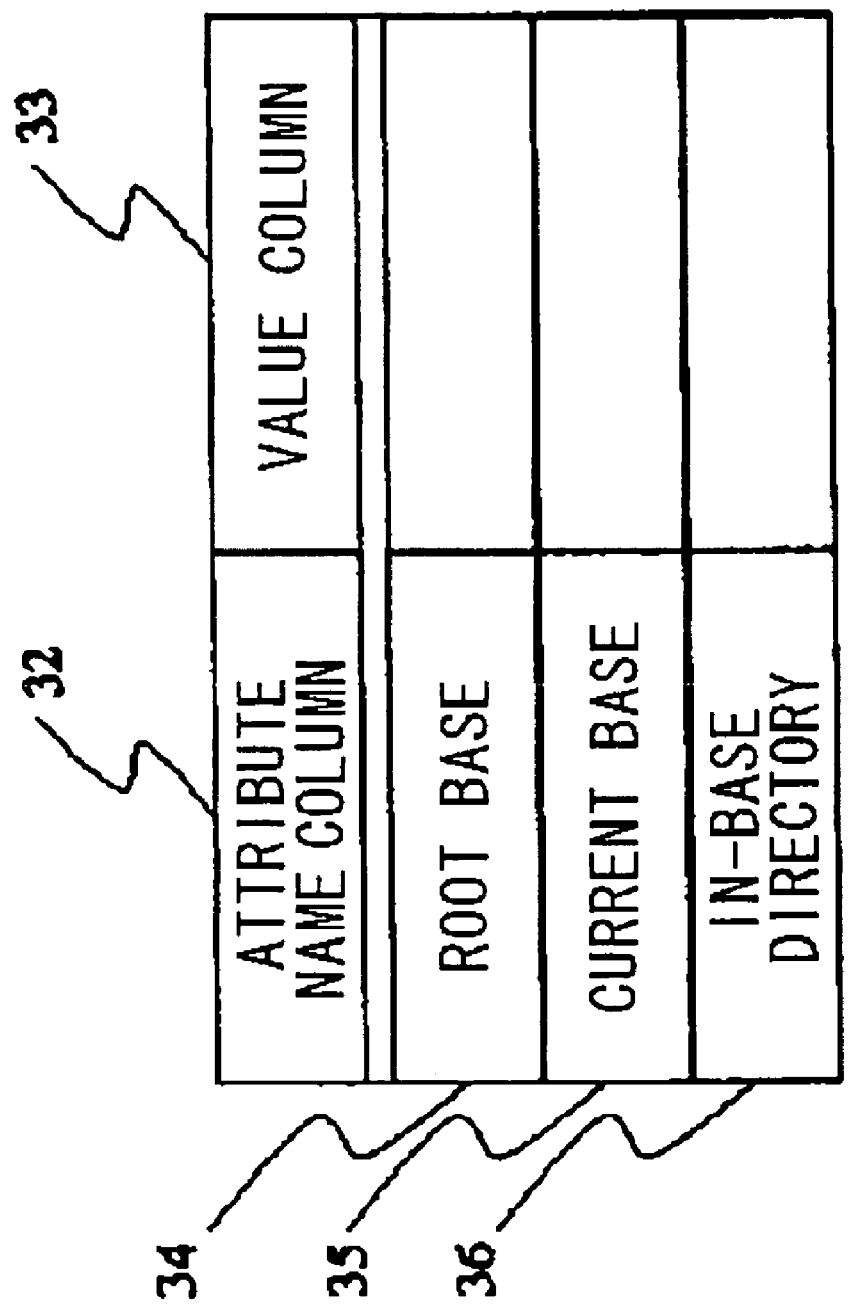
FIG. 5 shows an illustrative structure of a directory supervising table according to an embodiment of the present invention.

FIG. 5 shows an example of a structure of a storage table for the information responsible for supervising the directories inclusive of the current directory 24.

Referring to FIG. 5, the directory is supervised by pairs of attribute names 32 and values 33. The attributes are comprised of a root base 34, representing an agent base 9 where the shell agent 10 is booted, a current base 35 where the directory exists, and an in-base directory 36 specifying a local directory in the base.

For example, if the shell started in a base A indicates a directory [/home] of base B, the root base stores the base of the base A, the current base stores the base of the base B, and the in-base directory stores [/home].

In designating the directory by a user, an absolute path may be specified by
(1) [//base name A/in-base directory A] or
(2) [///in-base directory B].

In case of (1), the current base is [base name A], whilst the in-base directory is [in-base directory A]. In case of (2), the current base is [root base], whilst the in-base directory is [in-base directory B].

A relative directory may also be represented by [ . . . /], indicating a directory of an relatively higher hierarchy above the current directory or [dirA/dirB] indicating a directory [dirB] below the directory [dirA] below the current directory.

Figure 6:
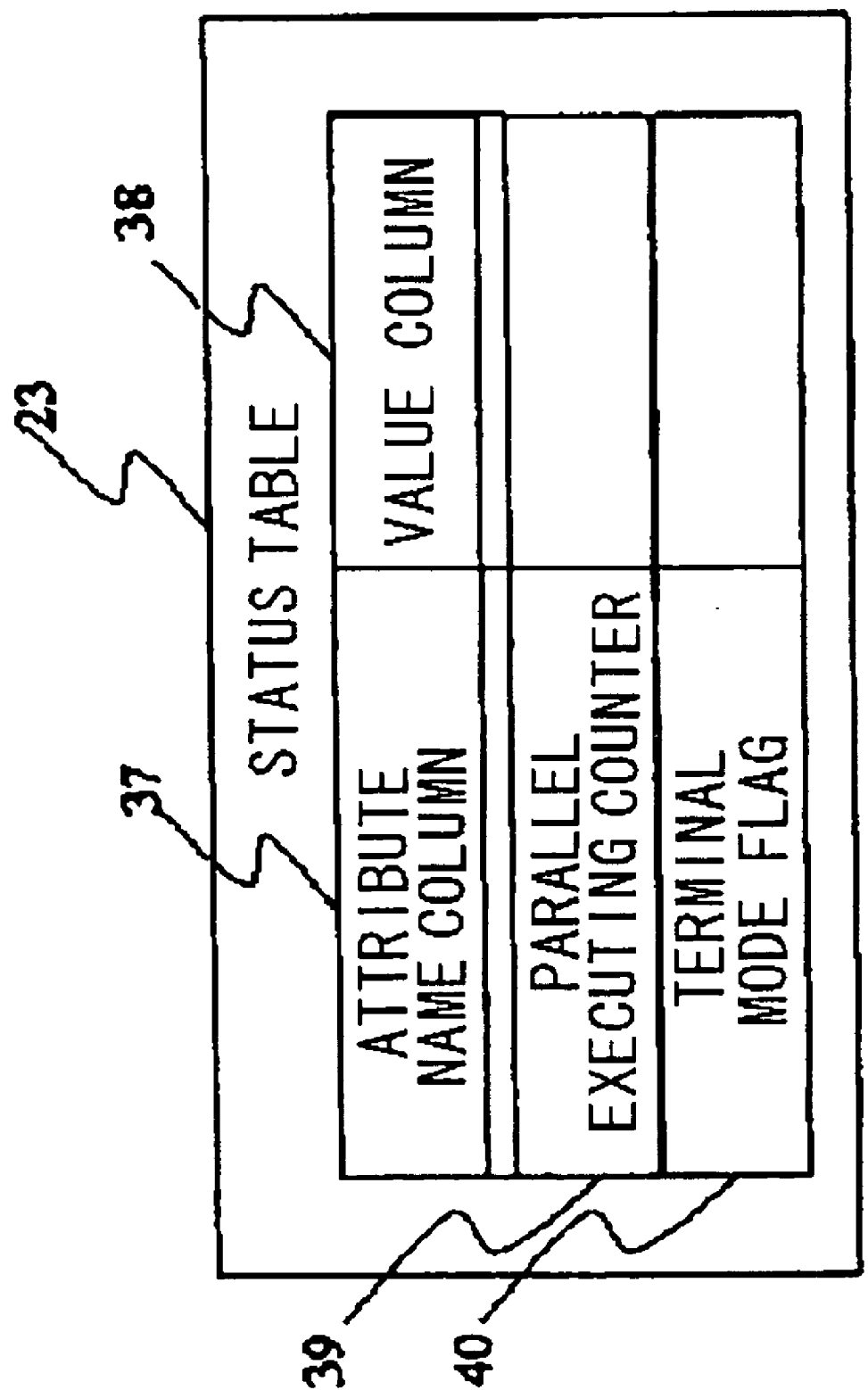
FIG. 6 shows an illustrative structure of a status table according to an embodiment of the present invention.

FIG. 6 shows an example of a structure of the status table 23 in an embodiment of the present invention. Referring to FIG. 6, the status is supervised by pairs of the attribute names 37 and values 38, with the attributes being comprised of a parallel executing counter 39, indicating whether or not the shell agent 10 is under execution in parallel, and a terminal mode flag 40, indicating whether the shell agent 10 is executed in the terminal input mode or in the batch mode.

Figure 7:
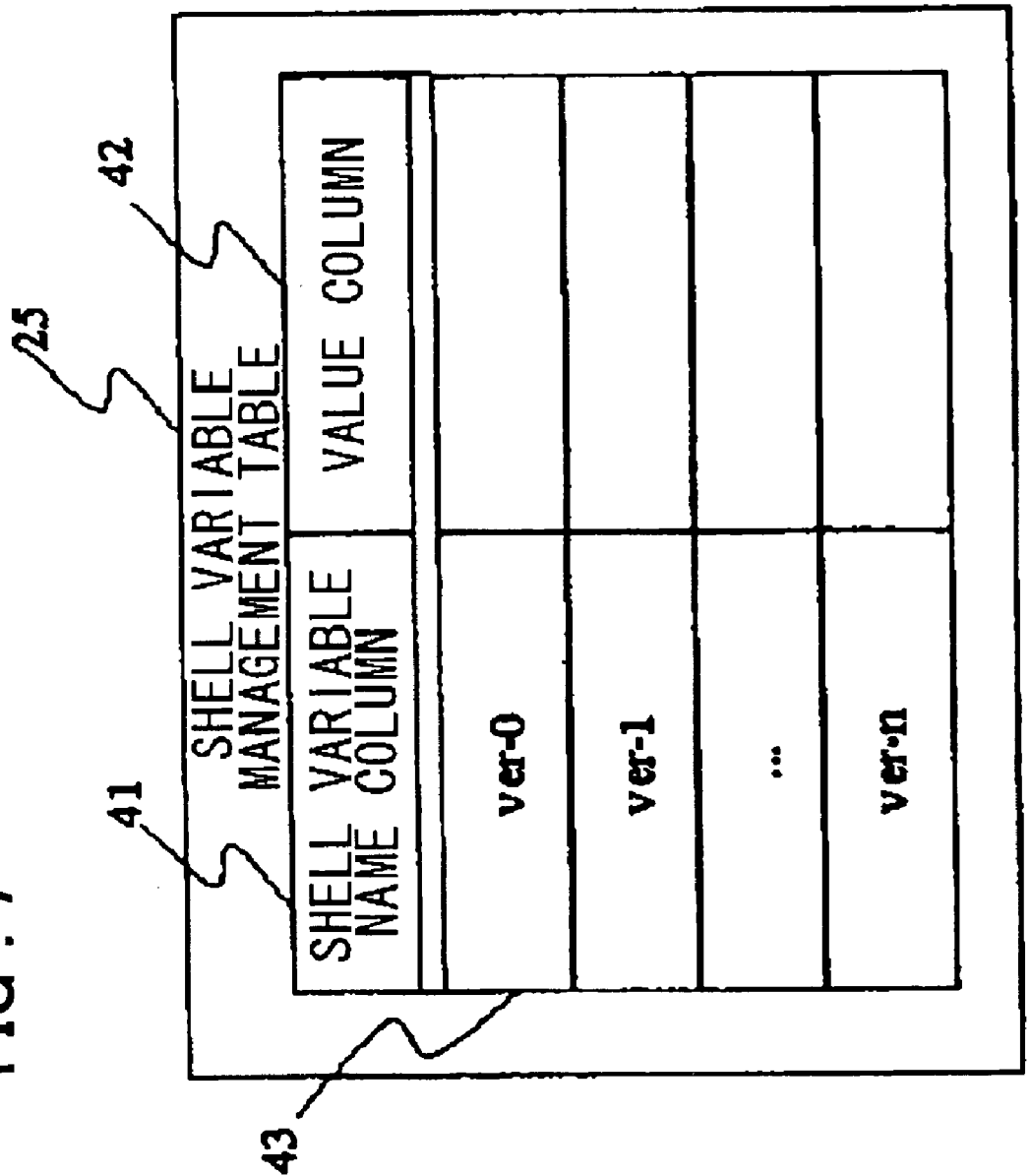
FIG. 7 shows an illustrative structure of a shell variable supervising table according to an embodiment of the present invention.

FIG. 7 shows an illustrative structure of a shell variable management table 25 in an embodiment of the present invention. Referring to FIG. 7 the shell variable management table 25 supervises the shell variables, with a shell variable name 41 and a value 42, paired together, and has a number of variable management units 43 equal to the number of the shell variables.

FIG. 8 shows an illustrative structure of an agent referencing table 26 of the shell agent 10 configured for managing agent variables as variables indicating the agents. Referring to FIG. 8, the agent referencing table 26 supervises the agent variables with an agent variable name 44 and an external agent 45 and has a number of variable management units 46 equal to the number of agent variables.

Figure 9:
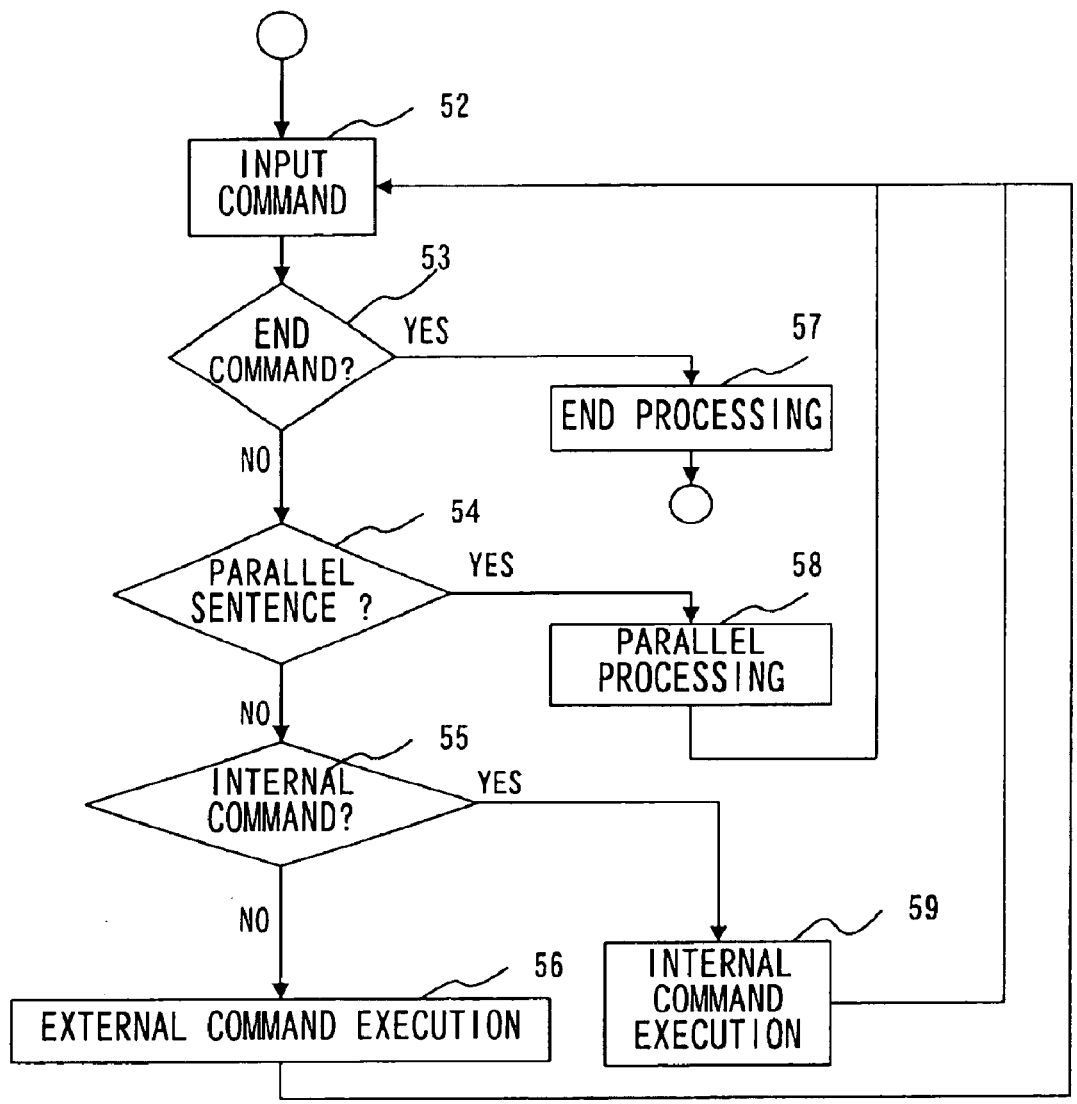
FIG. 9 is a flow diagram for illustrating the processing sequence in interpreting a script language according to an embodiment of the present invention.

FIG. 9 is a flow diagram for illustrating the operation of shell interpreter 20 in an embodiment of the present invention.

First, the shell interpreter 20 receives a command input from the input module 7 (step 52).

It is then verified whether or not this command is an end command (step 53). If the command is the end command, the end processing is carried out (step 57) to terminate the shell agent 10.

If the command is not the end command, the syntax analysis is performed by the syntax analyzing module (syntax analyzer) 21, using the keyword table 27, to check whether or not the sentence being analyzed is a parallel sentence (step 54).

If the sentence is the parallel sentence, the shell agent 10 is to execute commands in parallel. So, the shell interpreter 20 proceeds to parallel execution processing of step 58.

If the sentence is not the parallel sentence, the shell interpreter 20 verifies, by the command analyzing and executing module 22, whether or not the sentence can be processed as an internal command using the internal command table 28.

If the command is the internal command, the shell interpreter 20 proceeds to the internal command execution at step 59 and executes the internal command using the internal command definition module 29.

If the command is not the internal command, the shell interpreter 20 proceeds to external command execution (step 56).

If the parallel execution processing (step 58), internal command execution (step 59) and the external command execution (step 56) have come to an end, the shell interpreter 20 returns to the command inputting processing of step 52 to continue the processing.

The step of verifying whether or not the command is the end command of FIG. 9 (step 53) and the processing of verifying whether or not a sentence in question is a parallel sentence, by syntax analysis, may be reversed relative to each other.

Figure 10:
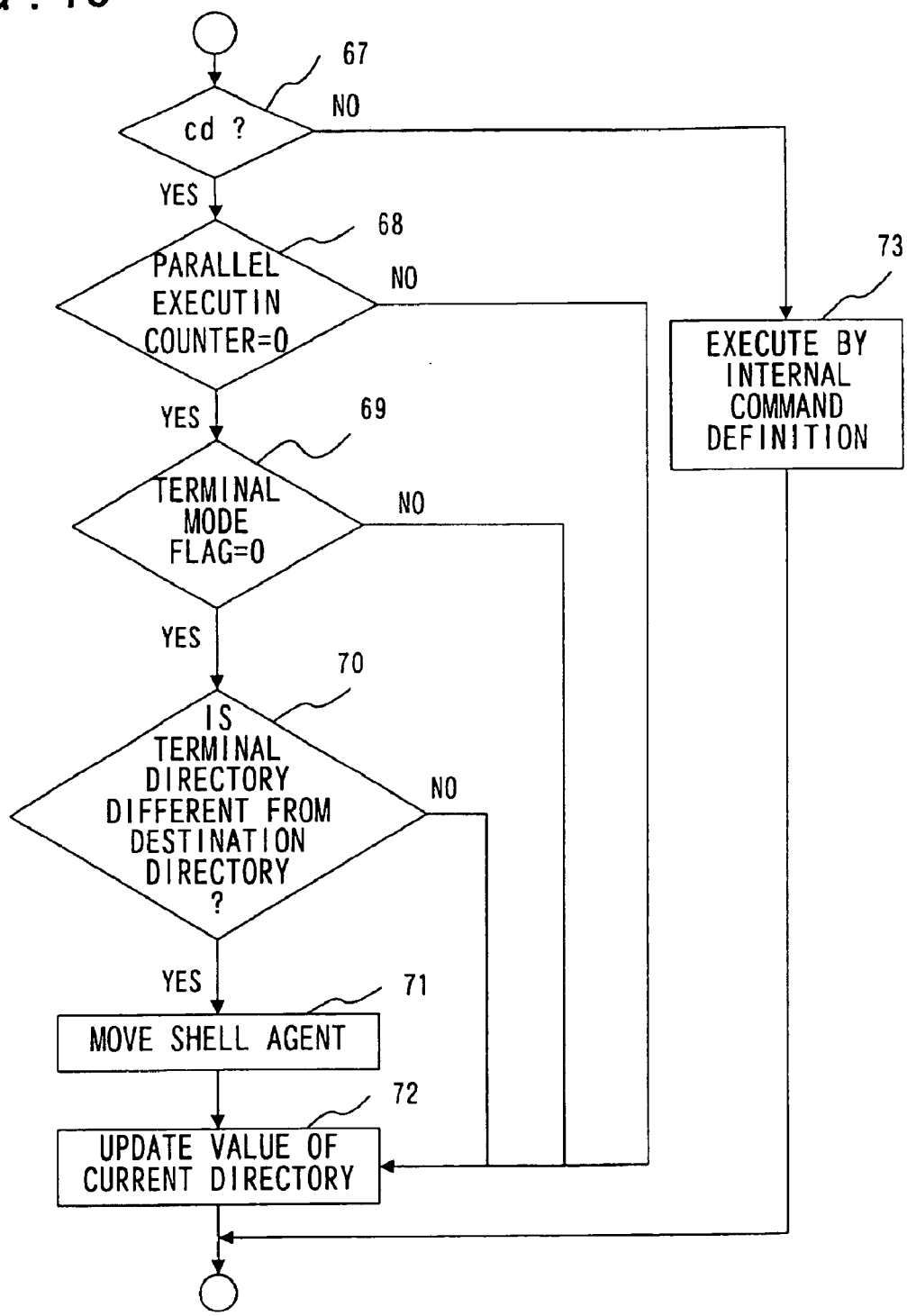
FIG. 10 is a flow diagram for illustrating the processing sequence in interpreting an internal command according to an embodiment of the present invention.
Figure 11:
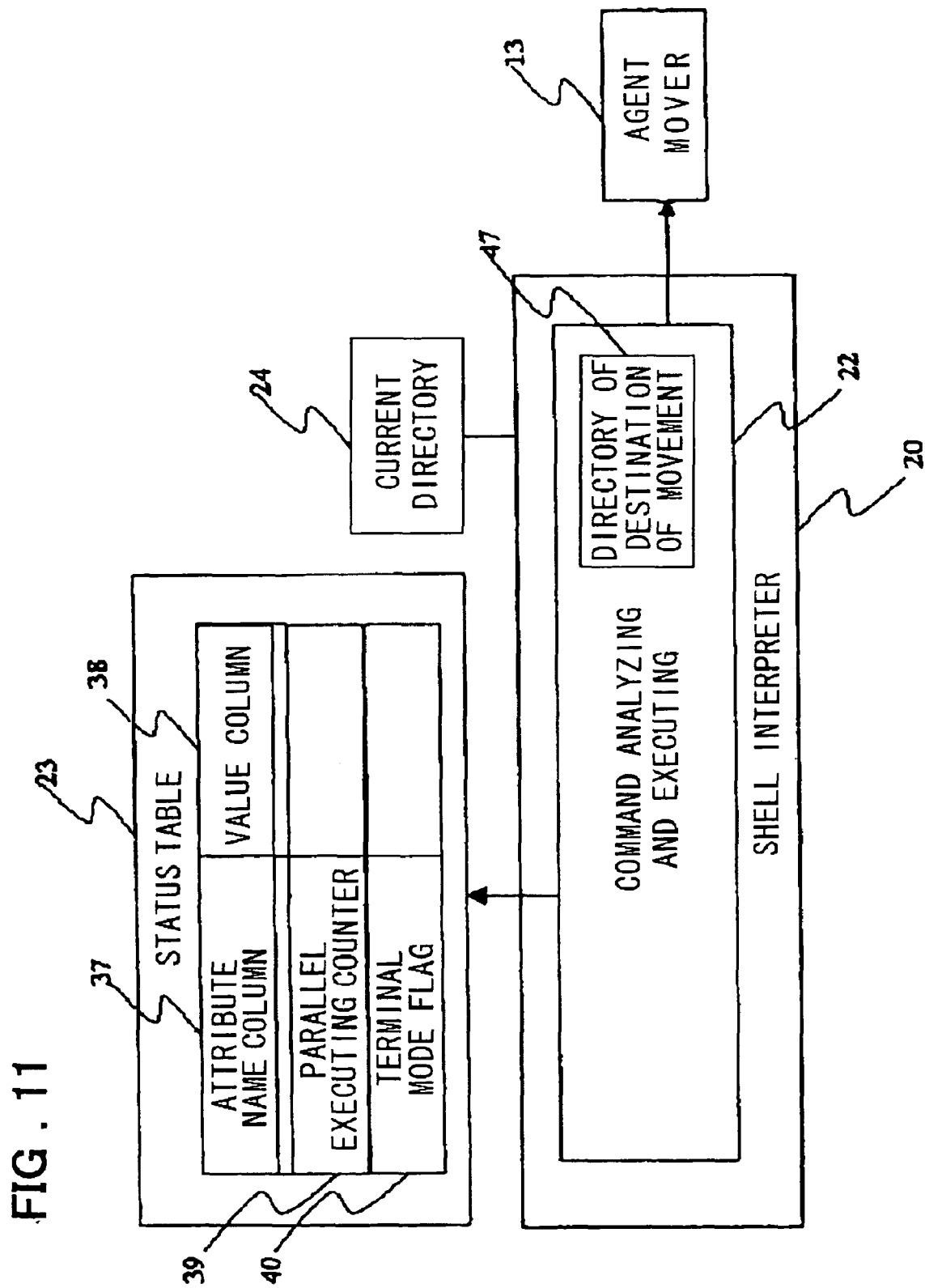
FIG. 11 illustrates directory movement according to an embodiment of the present invention.

FIG. 10 is a flow diagram in an embodiment of the present invention for illustrating the processing sequence of the internal command processing in the command analyzing and executing module 22 of the shell interpreter 20 of the shell agent 10 (step 59 of FIG. 9).

It is first verified whether or not the internal command is a command [cd] (cd command) indicating directory migration (step 67).

A command other than the [cd] command is executed in accordance with the internal command definition stored in the internal command definition module 29 (step 73).

If the internal command is [cd], the directory of the destination of migration 47 is extracted from the cd command, for which the direction of the destination of migration is now specified.

In the present embodiment, the user extends the directory into directory constituent elements, shown in FIG. 5, in order to utilize the directory in the form of a [//base name/in-base directory], and sores the base name and the directory in the base in the current base 35 and in the in-base directory 36, respectively.

The shell interpreter 20 then checks whether or not the value of the parallel executing counter 39 provided in the status table 23 is equal to [0] (step 68).

In this parallel execution counter, an information on the depth of parallel execution is stored as an information representing whether or not the shell agent is currently performing multi-thread operations.

If the parallel execution is not running, the value of the parallel execution counter is [0]. If the shell agent 10 is in the simplex parallel syntax, or in the parallel syntax, the value execution counter is [1] or [2], respectively.

If the value of the parallel execution counter is other than [0], it indicates that the shell agent is in parallel execution. Since the effect of migrating the entire shell agent to some other computer is small, only the operation of updating the value of the current directory 24 to the value of the directory of the destination of the migration indicated by the cd command (step 72), with the shell agent itself not being migrated between computers.

If the value of the parallel execution counter is [0], the shell agent is executing at a sole thread. Thus, the terminal mode is inspected (step 69), next.

A terminal mode flag 40, provided in the status table 23, has its value set to [1] or to [0] when the shell agent is being executed as a shell awaiting an input from a terminal or when the shell agent 10 is being executed as a batch command without being connected to a specified terminal, respectively.

If the value of the terminal mode flag 40 is [1], the shell agent is awaiting a terminal input, so that, if the shell agent has moved to another computer, the input response rate is lowered. Therefore, movement of the shell agent by the cd command between computers is not done and the program branches to step 72 where only the operation of updating the value of the current directory is performed.

If the value of the terminal mode flag 40 is [0], the shell agent 10 is being executed in a batch mode. It is more advantageous for the shell agent 10 to travel to a computer having a working directory. Therefore, the value of the current directory 24 is compared to that of a directory of destination of immigration 47 (step 70).

If the current directory 24 and the directory of destination of migration 47 are on the same computer, that is if the values of the current bases 35 are equal, shell agent movement between different computers is not needed. Therefore, the program branches to step 72 to execute only the updating of value of the current directory.

If the current directory 24 and the directory of the destination of migration 47 are not on the same computer, that is if the values of the current bases 35 are not equal, the shell agent is moved to an agent base of a computer where there exists the current base of the directory of destination of migration.

In this manner, the internal command [cd], issued by a user, is used not only for executing the processing pertinent to directory migration in the computer, but also for selecting the computer configured for executing the shell agent within the shell agent 10.

By this structure, execution of an application on a remote computer can be caused to appear to the user as if a directory has been migrated and an agent is executed, so that, when plural remote application are operated in concert in order to execute services distributed over a network, statement by simplified script language is possible.

Figure 12:
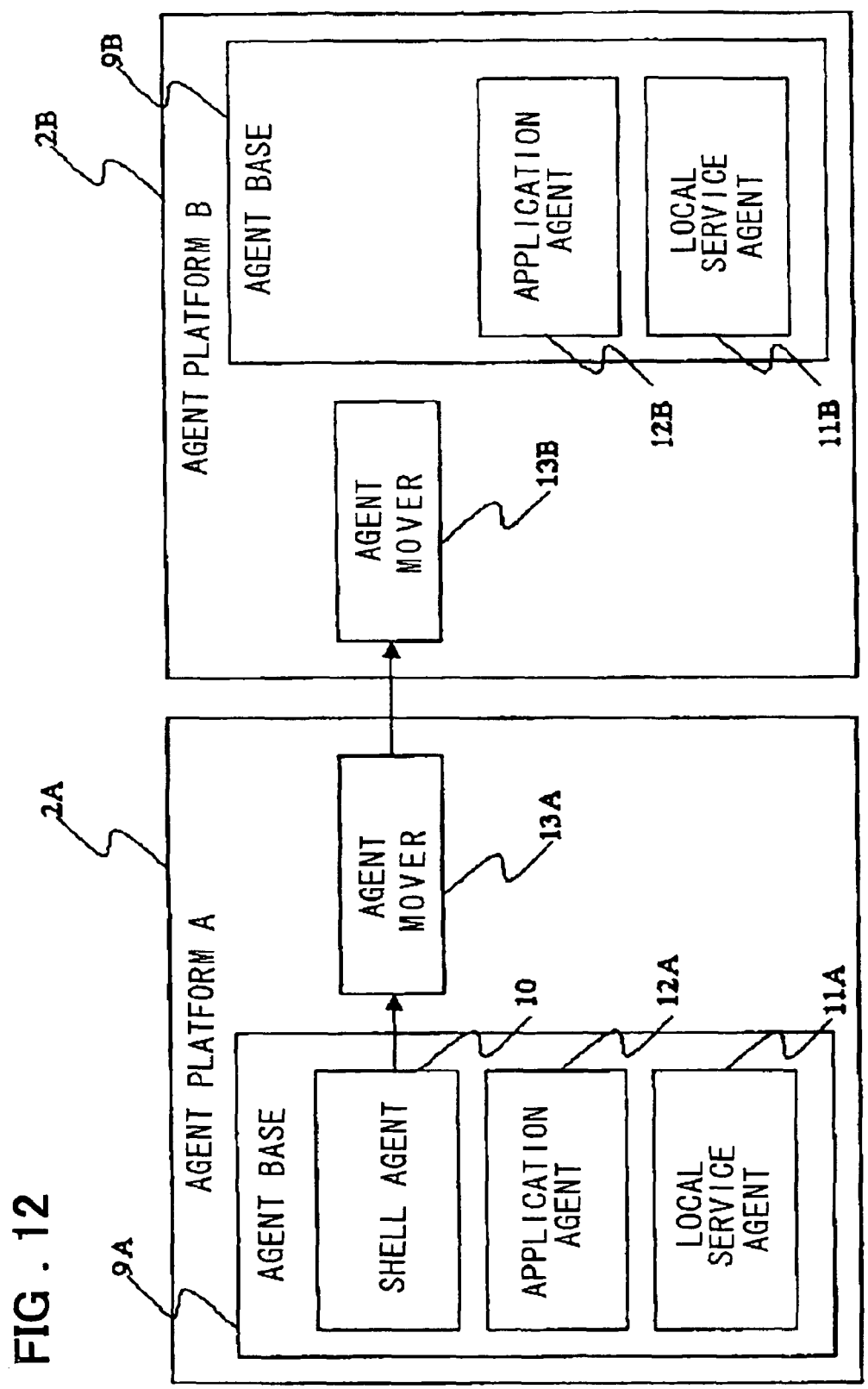
FIG. 12 illustrates a first example of directory movement according to an embodiment of the present invention.
Figure 13:
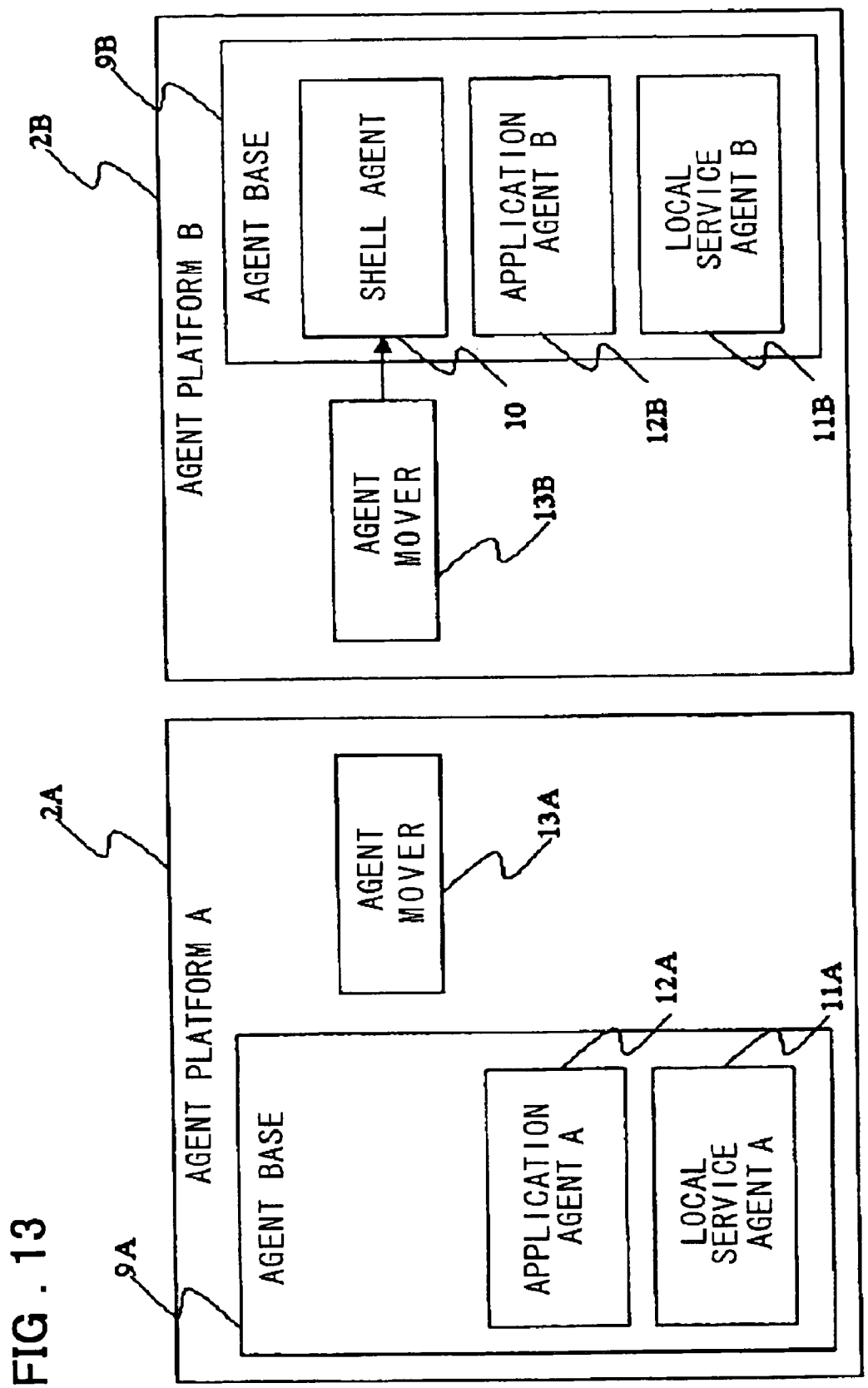
FIG. 13 illustrates a second example of directory movement according to an embodiment of the present invention.

FIGS. 12 and 13 illustrate changes in the configuration in case of shell agent migration, according to an embodiment of the present invention.

Referring first to FIG. 12, the shell agent 10, situated on an agent platform A 2A, requests an agent movement module (agent mover) 13A to move the shell agent 10 itself.

The agent mover 13A transfers the state of the shell agent 10 to an agent mover 13B of an agent platform B 2B.

Referring to FIG. 13, the agent mover 13B re-constructs the shell agent 10 on the agent platform B 2B to re-start the execution.

Figure 14:
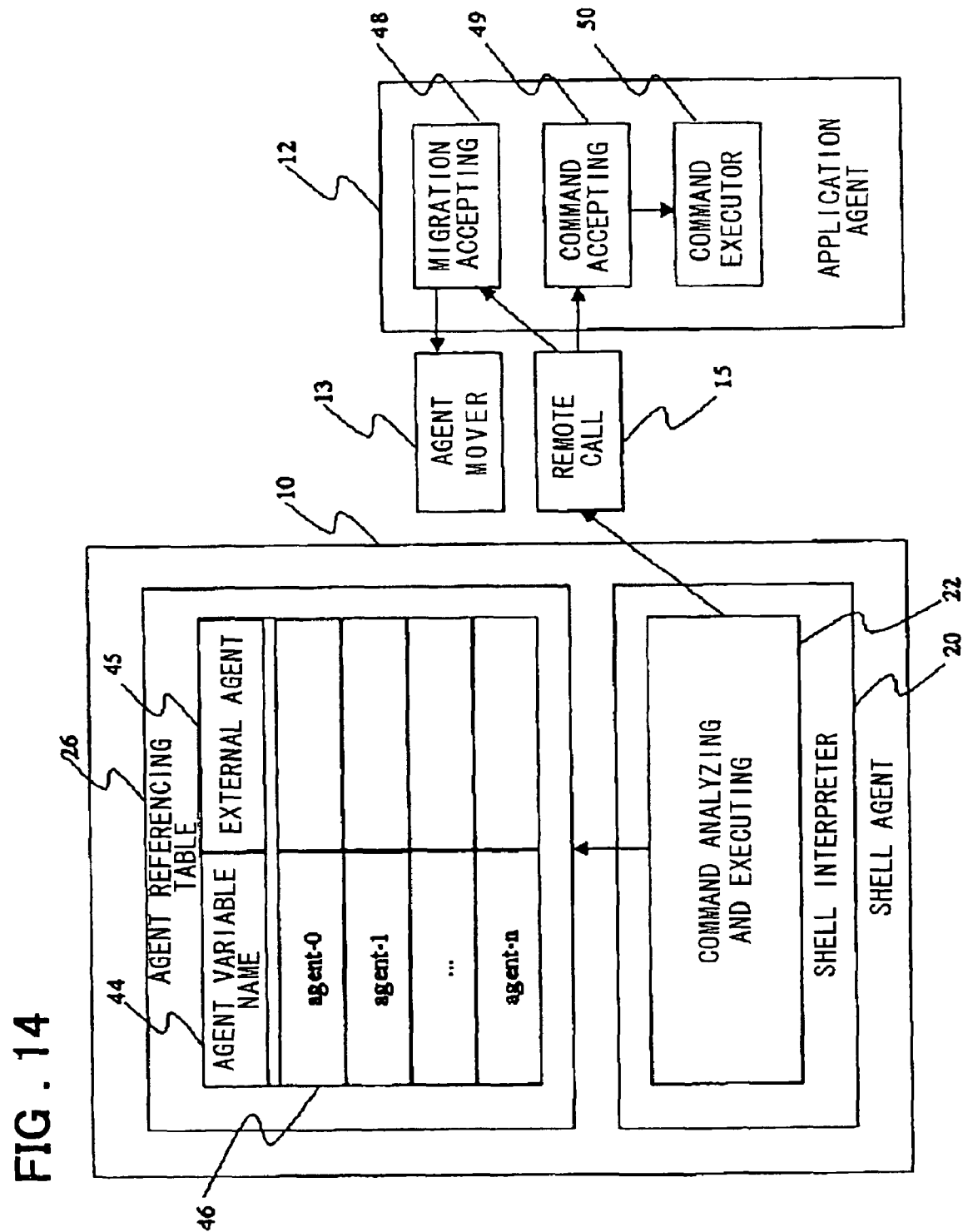
FIG. 14 illustrates execution of a remote command according to an embodiment of the present invention.

FIG. 14 illustrates a case in which an internal command issues a request for method execution or migration to an external application agent 12 when the internal command is executed in the command analyzing and executing module 22 according to an embodiment of the present invention.

For identifying an external application agent indicated by the agent variable, the command analyzing and executing module 22 acquires a pointer to an external application agent, from the name of the agent variable, using the agent referencing table 26.

The command analyzing and executing module 22 requests the remote call module 15 to execute the method or migration to the external application agent 12.

The application agent 12 has, as remote control accepting module, migration accepting module 48 and command accepting module 49.

After confirming the rights to make request for movement, the migration accepting module 48 requests the agent mover 13 to move the application agent 12 itself.

After confirming the rights to execute the command, the command accepting module 49 executes command executing module 50.

Figure 15:
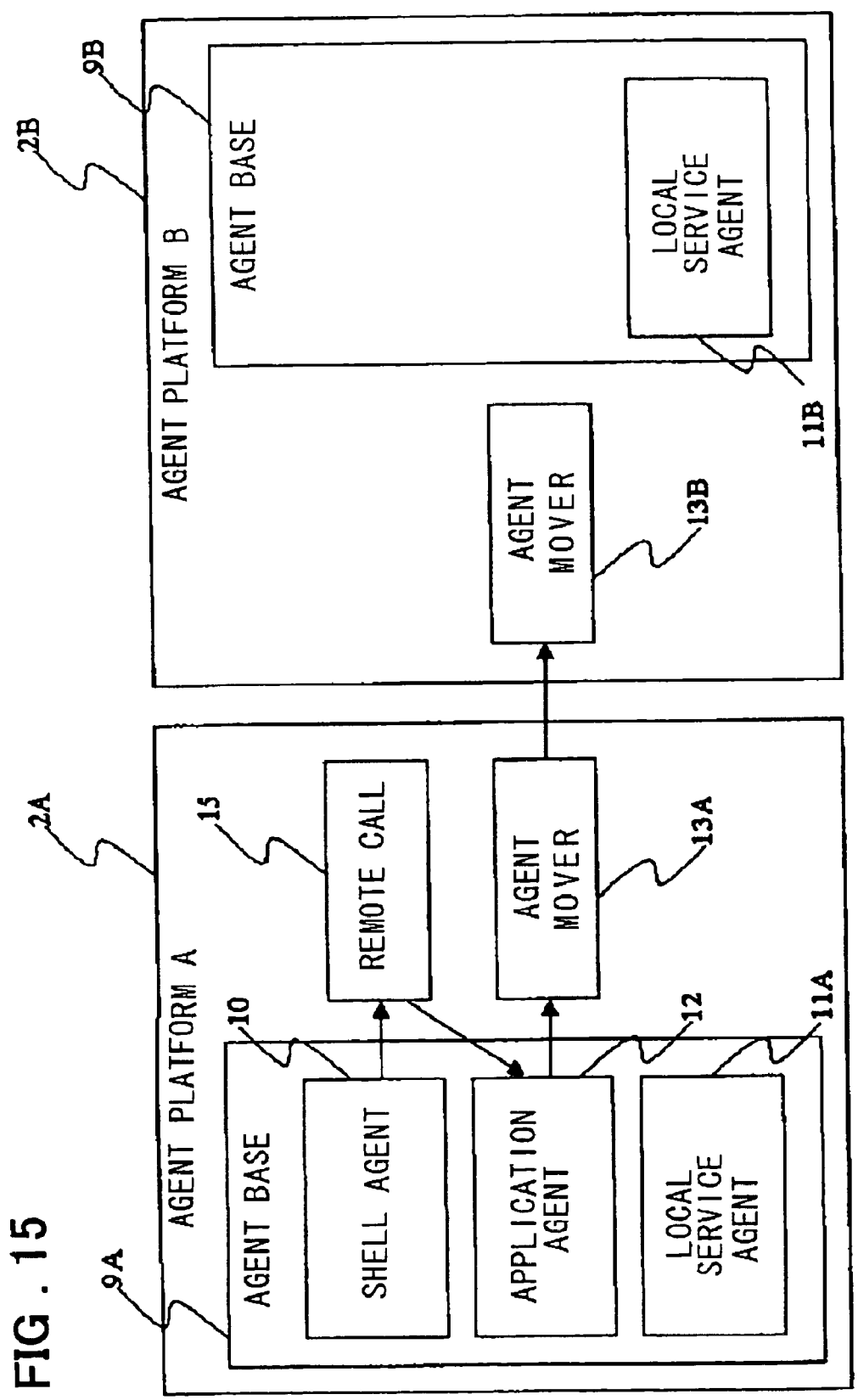
FIG. 15 illustrates a first example of execution of a remote command according to an embodiment of the present invention.
Figure 16:
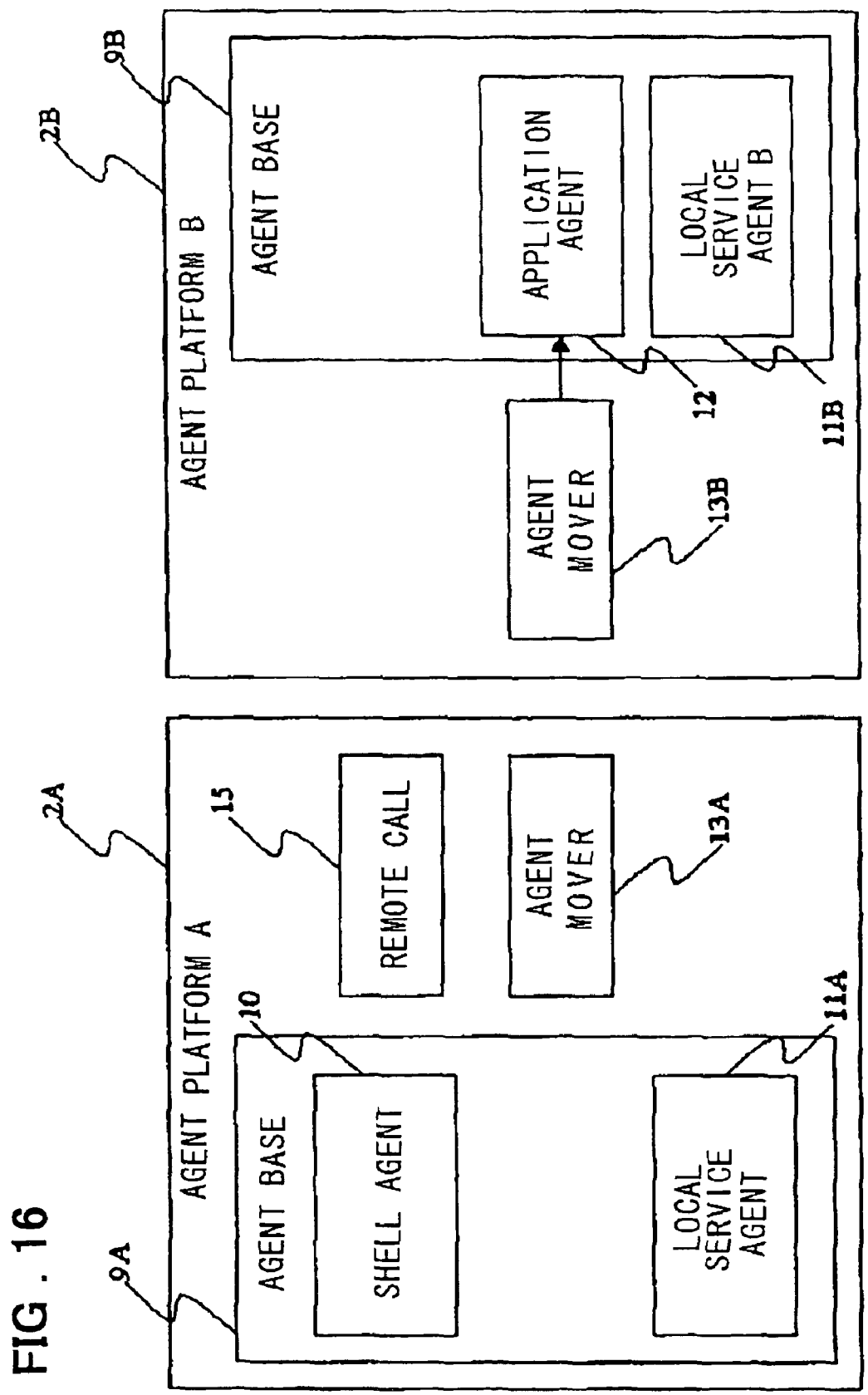
FIG. 16 illustrates a second example of execution of a remote command according to an embodiment of the present invention.

FIGS. 15 and 16 illustrate changes in the configuration in an embodiment of the present invention when an application agent 12 in the same computer from the shell agent 10 is moved to another computer.

Referring first to FIG. 15, the shell agent 10 transfers a movement command to the application agent 12, using remote call module 15.

The application agent 12 asks the agent mover 13A to move the application agent 12 itself, whereupon the agent mover 13A transfers the status of the application agent to the agent mover 13B of the agent platform B 2B.

Referring to FIG. 16, the agent mover 13B re-constructs the application agent 12 on the agent platform B 2B to re-initiate the execution.

In FIGS. 15 and 16, the application agent lying in the same first agent platform as that where the shell agent 10 lies. Alternatively, an application agent maybe present in a second agent platform different from that where the shell agent lies, with the application agent then being moved to a third agent platform or to a first agent platform where the shell agent lies.

Figure 17:
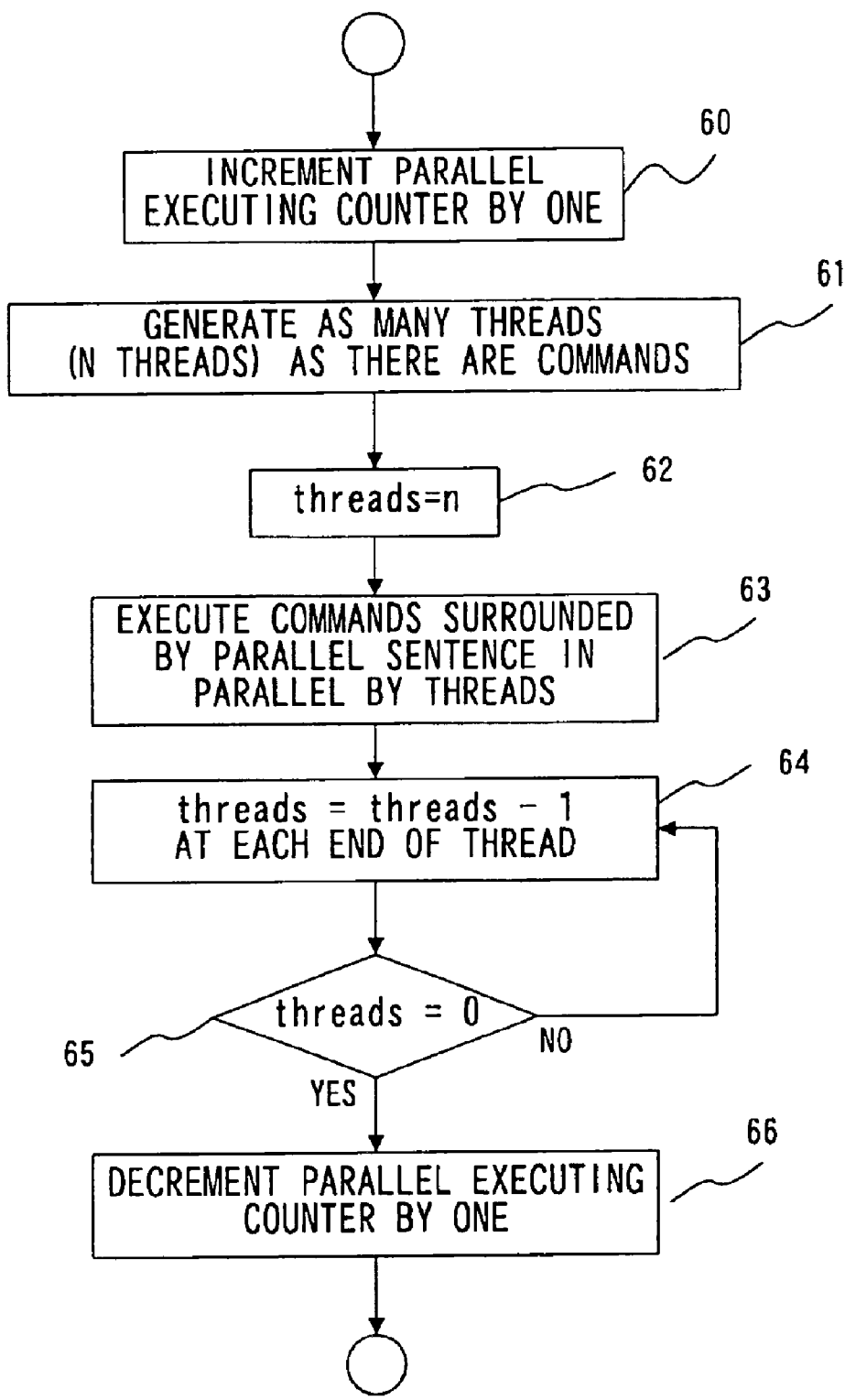
FIG. 17 is a flowchart for interpreting parallel execution according to an embodiment of the present invention.

FIG. 17 is a flowchart in an embodiment of the present invention in which a parallel sentence is detected by the syntax analyzing module 21 to execute the parallel execution processing (step 58) of FIG. 9.

First, the parallel executing counter 39 of the status table 23 is incremented by 1 at step 60. This records that the shell agent is currently by parallel execution.

Then, as many threads as there are commands in the parallel sentence then are generated (step 66). It is the thread generating module (thread generator) 14 that is responsible for thread generation.

The number of the generated threads is set in the variable [threads] (step 62).

In actuality, the commands in the parallel sentence are executed in parallel by each thread.

When each thread completes its own execution, the value of the thread variables is decremented by [1] (step 64). This processing needs to be exclusively controlled between the threads.

It is then verified whether or not the thread variable has become equal to [0]. If the thread variable is not equal to 0, the program waits for the end of the next thread.

When the entire threads have come to a close, the value of the thread variable is [0], at which time the parallel execution comes to a close.

The value of the parallel executing counter 39 is decremented by one (subtraction) at step 66 to terminate the execution of the parallel execution in its entirety.

FIG. 18 shows the configuration in an embodiment of the present invention when in particular a thread generated in the parallel sentence executes a command on another agent platform.

Referring to FIG. 18, the shell agent 10 asks the thread generating module 14 to generate a new thread, after which the shell agent 10 prepares a sub-shell agent 51 on the agent base 9B of the agent platform 2B, in order to execute the internal command of the parallel sentence.

The sub-shell agent 51 then is able to execute the method or the movement command to the application agent 12 or to the local service agent B 11B.

Figure 19:
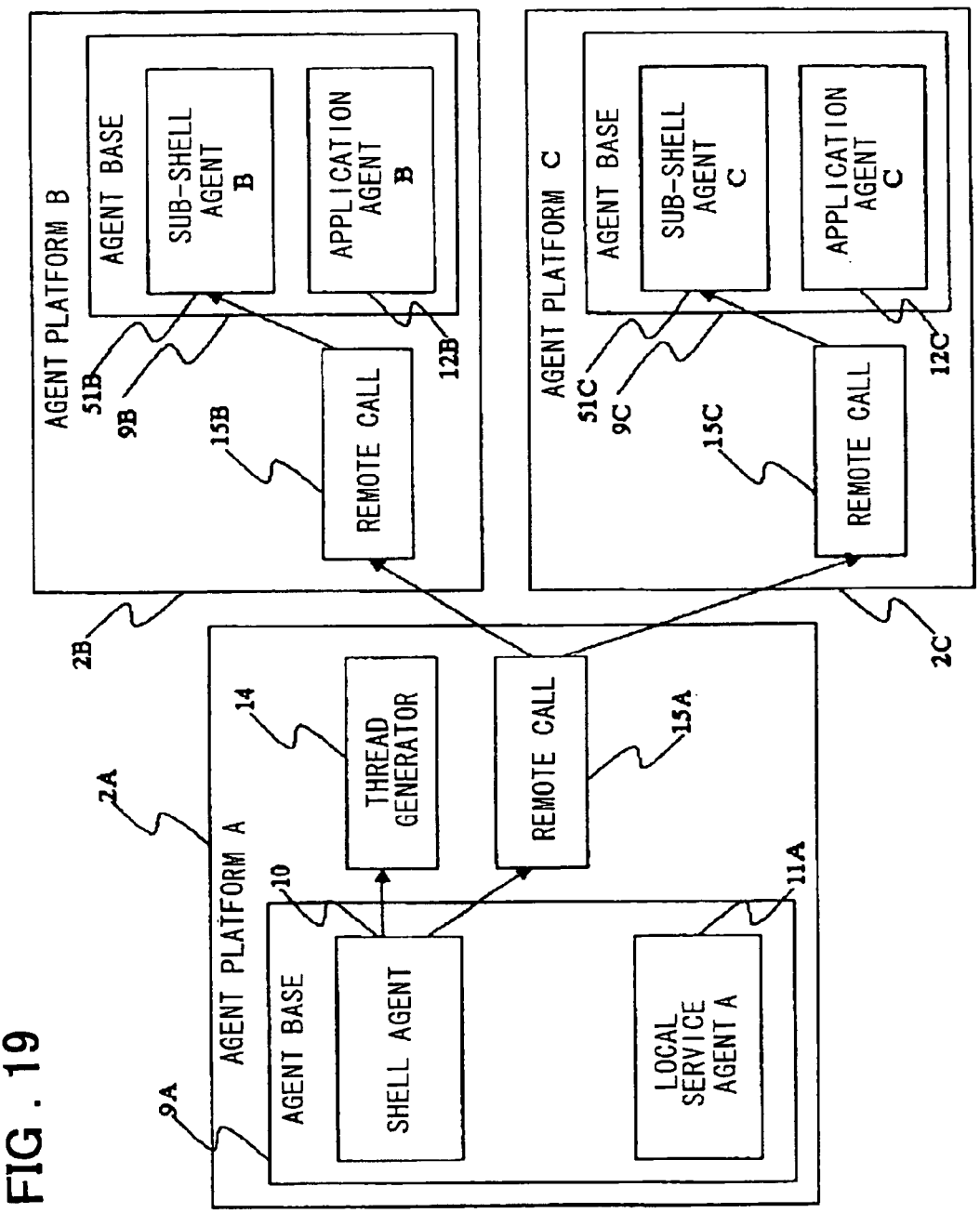
FIG. 19 illustrates a flowchart showing a second example of parallel execution according to an embodiment of the present invention.

FIG. 19 illustrates the case of parallel command execution on plural agent platforms in the parallel agent platforms in the parallel sentence.

Referring to FIG. 19 a sub-shell agent 51B and a sub-shell agent 51C are generated by a remote call from the shell agent 10 to enable sub-shell agents to be executed in parallel on the two agent platforms, that is agent platform 2B and agent platform 2C.

Figure 20:
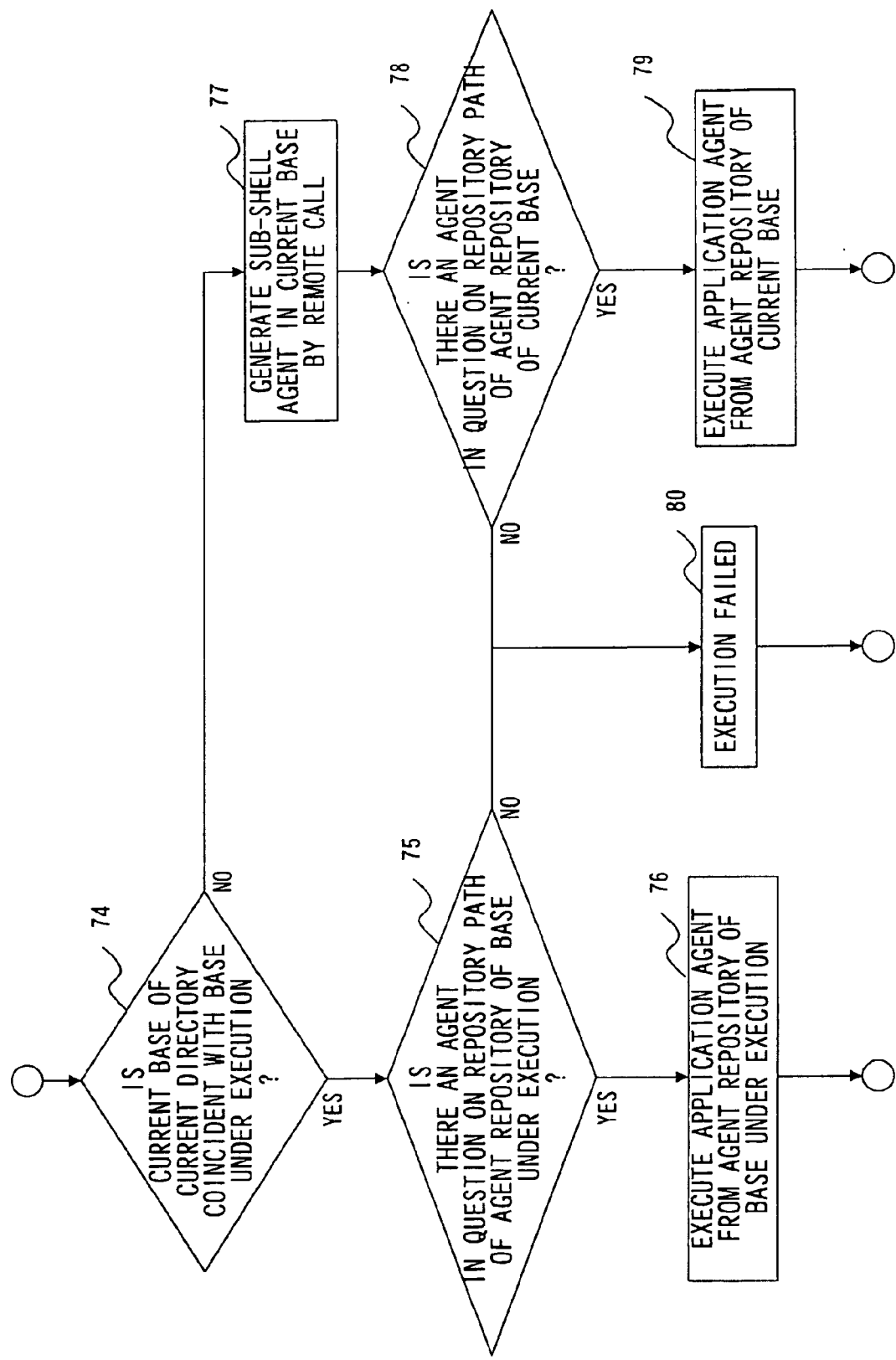
FIG. 20 is a flowchart showing a processing sequence for interpreting execution of an application agent according to an embodiment of the present invention.

FIG. 20 is a flow diagram showing the processing sequence for executing external command processing of FIG. 9 (step 56) in an embodiment of the present invention.

Referring to FIG. 20, a method in which the external command executor 30 directly invokes the agent generator 16, as shown in FIG. 3, is used as a method for starting the external application agent.

It is first checked whether or not the current base stored in the current directory 24 coincides with the currently operating base which is actually executing the shell agent (step 74).

If the result of check is affirmative, it is first verified whether or not the program of the application agent in question is present on an agent repository path of the agent repository 19 of the currently executed base (step 75).

If there is present the program of the application agent, the agent generator 16 is requested to load the program of the application agent from the agent repository 19 to execute the application agent 12 (step 76).

If no agent repository 19 is found, the execution results in failure (step 80).

If, in a step 74 when it is verified whether or not the current base stored in the current directory 24 coincides with the base currently executing the shell agent, the result of check indicates non-coincidence, the sub-shell agent 51 is prepared in the current base using remote call module 15 (step 77).

Figure 21:
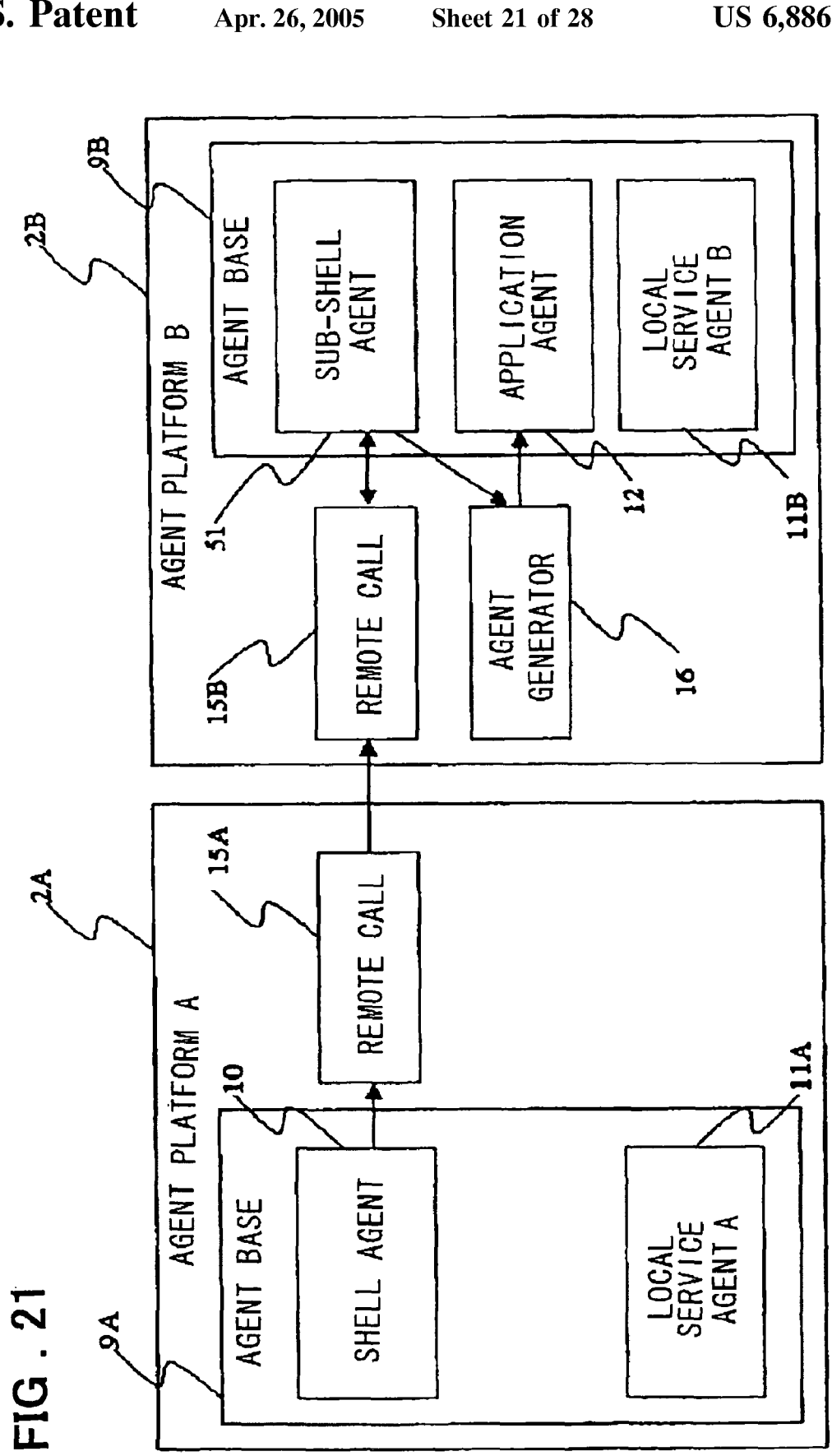
FIG. 21 illustrates a flowchart showing a first example of execution of an application agent according to an embodiment of the present invention.

FIG. 21 shows the relation among different constituent elements in this case.

It is checked whether or not the program of the application agent in question is present in the agent repository path of the agent repository 19 of the current base (step 78).

If there is any such program of the application agent, the agent generator 16 is asked to load the program of the application agent from the agent repository 19 to execute the application agent 12 (step 79).

If no agent repository is found, the execution results in failure (step 80).

Figure 22:
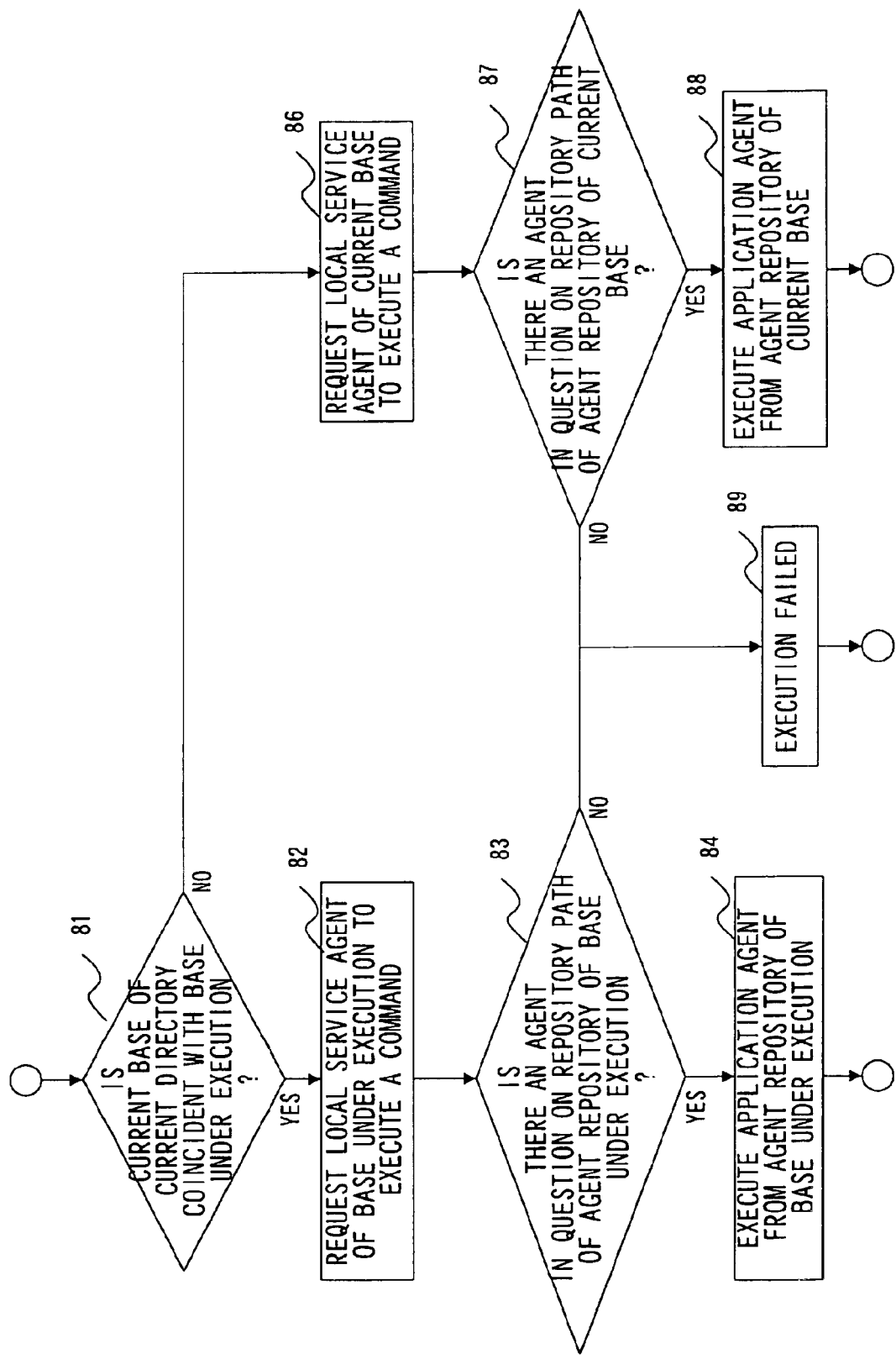
FIG. 22 illustrates a flowchart showing a processing sequence for interpreting execution of an application agent according to an embodiment of the present invention.

FIG. 22 is a flowchart for illustrating the processing sequence for executing the external command processing of FIG. 9 (step 56).

Referring to FIG. 22, a method of entrusting the task pertinent to the agent generation to the local service agent 11, as shown in FIG. 4, to cause the local service agent 11 to invoke the agent generating module 16, is used as a method of starting the external application agent.

It is first checked whether or not the current base stored in the current directory 24 coincides with the current base actually executing the shell agent (step 81).

In case of coincidence, the local service agent 11 of the current base is asked to execute the external agent (step 82), in order to generate the external application agent on the current base.

The local service agent 11 then checks whether or not there exists the program of the application agent in question on the agent repository path of the agent repository 19 of the current base (step 83).

Should there exist the program of the application agent, the agent generator 16 is asked to load the program of the application agent from the agent repository 19 to execute the application agent 12 (step 84).

If no agent repository is found, the execution results in failure (step 89).

In case of non-coincidence at step 81 of verifying whether or not the current base stored in the current directory 24 with the current base actually executing the shell agent, the local service agent 11 of the current base is asked to execute the external agent, using the remote call module 15 (step 86).

Figure 23:
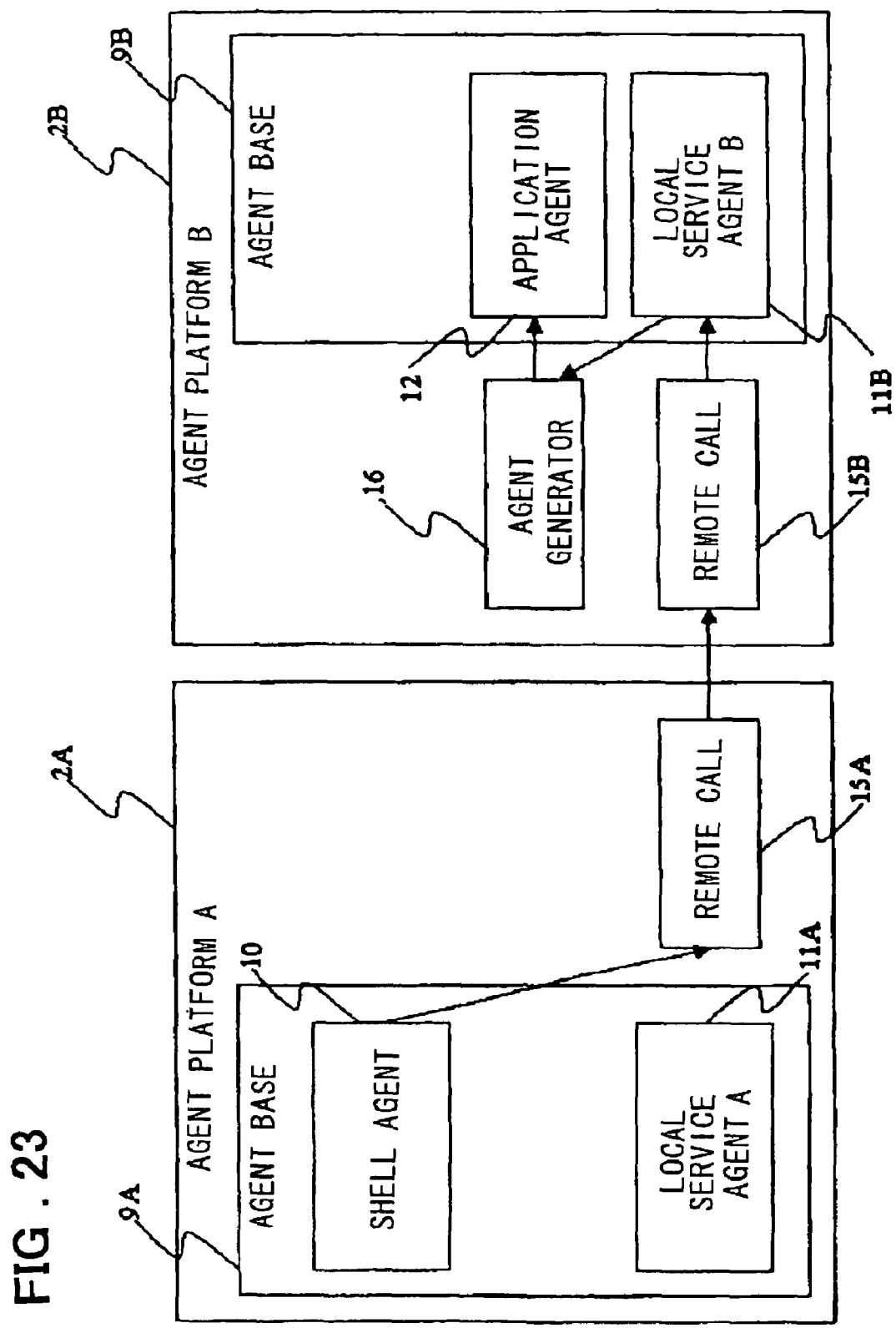
FIG. 23 is a flowchart showing a second example of execution of an application agent according to an embodiment of the present invention.

FIG. 23 shows the relation among the different constituent elements in this case.

Referring to FIG. 23, the local service agent 11B verifies whether or not the program of the application agent in question exists on the agent repository path of the agent repository 19 of the current base (step 87 of FIG. 22).

Should there exist the program of the application agent, the agent generator 16 is asked to load the program of the application agent from the agent repository 19 to execute the program (step 88 of FIG. 22).

If no agent repository is found, the execution results in failure (step 89) of FIG. 22).

FIG. 24 shows the relation among the application agent 12, a specified file 96 and an external application 18 booted by the application agent.

The application agent 12, intimately related with a specified external application, is able to interpret and execute the file 96.

FIG. 25 shows the configuration in an embodiment of the present invention for computer-dependent startup of an application 12 employing a general-purpose application agent 97.

Referring to FIG. 25, general-purpose application agent 97 checks an extension of the designated file 96 to reference an extension application accommodating table 98 to determine the application to be executed. This extension application accommodating table 98 is a table which has stored therein extensions 99 and applications 100 in paired state and hence has stored therein the extension-based information 101 per extension by extension.

The general-purpose application agent 97 retrieves items having an extension 99 coincident with the extension of the file 96 to start the application of an application column 100 of a pertinent item.

The extension application accommodating table 98 may be provided on each computer, so that an image file having the same extension may be displayed on a different computer using a different application.

For more specifically explaining the above-described, several specified embodiments of the present invention will be explained in detail.

Figure 26:
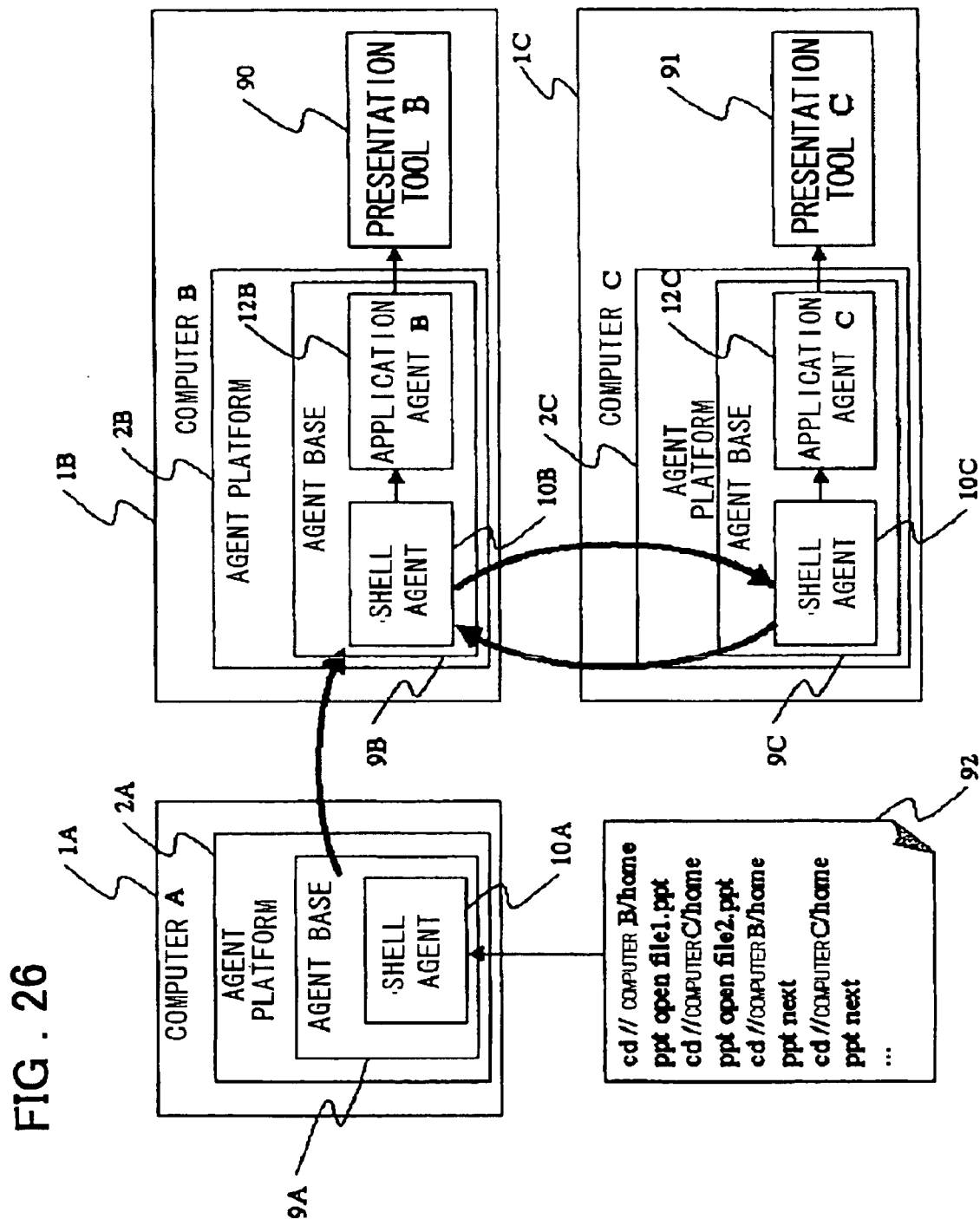
FIG. 26 illustrates a first embodiment of a system embodying the present invention.

FIG. 26 shows an illustrative structure of a system configuration embodying the present invention, and specifically shows the configuration of a system sequentially controlling two presentation tools on two computers.

First, there is a shell agent 10A on the agent base 9a of the agent platform 2A of a computer A 1A. It is to this shell agent 10A that an execution script file 92 is input.

In this case, the execution is in the batch mode, so the terminal mode flag 40 of the status table 23 is 0. Since any parallel sentence indicating parallel execution is not used, the shell agent moves through the inside of the computer by a cd command in the script.

By the [cd] in row 1 of a script file 92, the shell agent 10A moves to a local directory [/home] of agent base 9B of an agent platform 2B of a computer B 1B.

The [ppt] command in row 2 of the script file 92 is then executed. It is assumed that the ppt command is the name of the application agent B 12B which starts an external presentation tool B 90.

Therefore, the shell agent 10B boots the application agent B 12B which then boots a presentation tool B 90 to start the presentation.

Then, with the cd command on row 3 of the script file, the shell agent 10B moves to a local directory [/home] of an agent base 9C of an agent platform 2C of a computer C 1C.

At row 4, the application agent C 12C is booted to start execution of a presentation tool C 91.

With [cd] at row 5 of the script file 92, the shell agent moves to the computer B to transmit the command (next) for displaying [next page] on the presentation tool B.

At rows 7 and 8, the shell agent moves to the computer C. The presentation tool C also displays next page.

In this manner, the operation of sequentially folding over pages in the presentation tools of plural computers can be described in a sole shell script.

Figure 27:
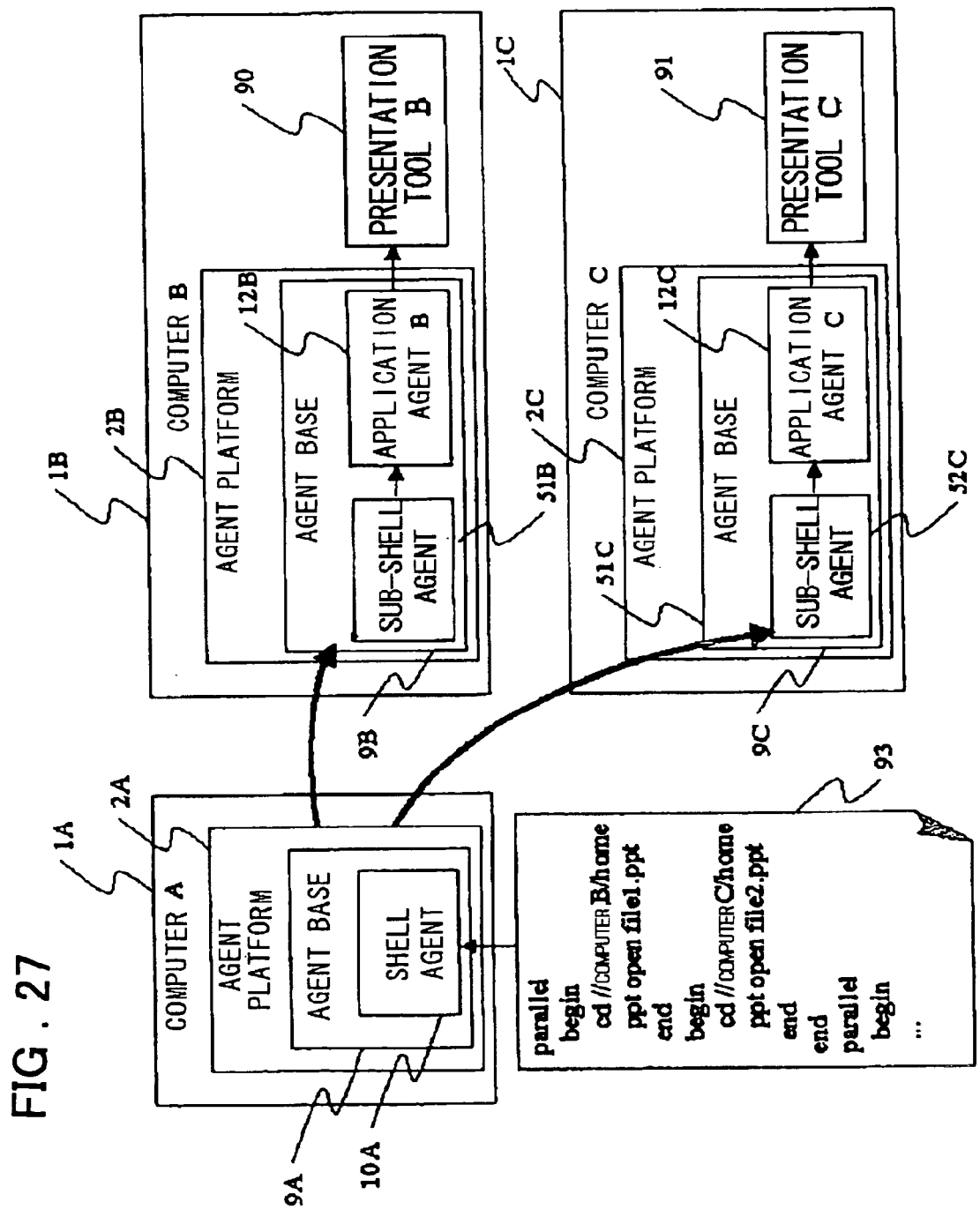
FIG. 27 illustrates a second embodiment of a system embodying the present invention.

FIG. 27 shows another illustrative system embodying the present invention and specifically shows the configuration controlling two presentation tools on two computers.

The system shown in FIG. 27 differs from the system shown in FIG. 26 in that a parallel sentence is being used in a script file 93.

In the parallel sentence, a sub-shell agent is prepared in each of the computers B and C to respectively control the application agent B 12B and the presentation tool B 90, or the application agent C 12C and the presentation tool C 91 in parallel.

In the present system, in distinction from the system shown in FIG. 26, the application is run in parallel and the sub-agent [parallel] is synchronized in a row [end] at the end of the parallel sentence.

Figure 28:
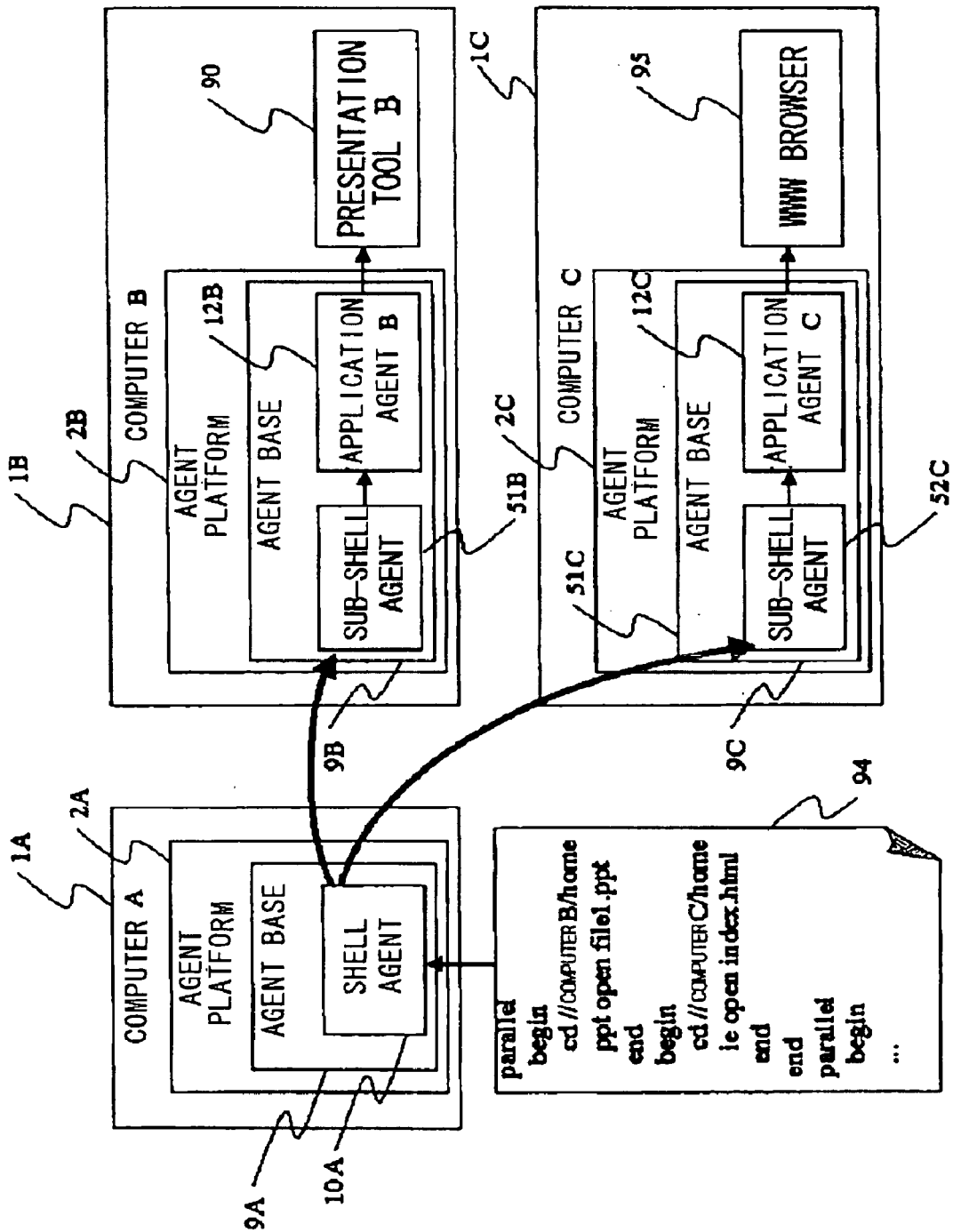
FIG. 28 illustrates a third embodiment of a system embodying the present invention.

FIG. 28 shows another embodiment of the system of the present invention, and specifically shows a system for controlling a presentation tool 90 and a WWW (WorldWideWeb) browser 95 in parallel on two computers. FIG. 28 differs from FIG. 27 in that an object of control is an application different from that of FIG. 27.

Using the present embodiment, there can be easily constructed a system configured for displaying the information of relevant WWW pages in parallel and with synchronizing functions on plural computers.

The meritorious effects of the present invention are summarized as follows.

As discussed above, the following meritorious effects are achieved by the present invention.

It is a first effect of the present invention is that execution of plural applications distributed over plural computers can be controlled using a sole script program. The result is that there can be easily constructed a distributed application of a higher hierarchy order by plural applications acting in concert.

The reason is that, in the present invention, interpretation of the script language is constructed by a shell agent capable of mobility and communicating with remote computer computers, whilst the application agent controlling the application execution can be universally generated and executed on any optional one of the computers.

It is a second meritorious effect of the present invention that the script can be executed not only sequentially but also in parallel, and that the parallel or synchronous execution of the applications distributed over plural computers can be easily described using a script language.

The reason is that, in the present invention, a block termed "parallel" is provided in a sentence grammar element of the script language, and that, for parallel execution of commands in this block, there are provided the functions of generating plural threads and executing the generated thread in the sub-shell agent in a remote computer.

It is a third meritorious effect of the present invention that directory movement between different computers and directory movement in a computer can be realized by a sole directory movement command such that shell agent movement is enabled without using a special command for agent movement.

The reason is that, in the present invention, there is provided a function of supervising the current directories, the computer within which actually resides a shell agent, or the status of the shell agent, within the shell agent, such that, in case of necessity, the shell agent can move between different computers.

It is a fourth meritorious effect of the present invention that, even if there differs an application provided from one computer to another, each application can be executed depending on file contents.

The reason is that, in the present invention, there is provided a function of specifying and executing an application conforming to the computer so that the application agent is able to prepare a general-purpose application agent to render it possible to selectively execute a computer-dependent application in keeping with the extension of a file which is to be executed.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. In a system in which a plurality of computers are interconnected over a network, a distributed application control system, wherein an agent platform owned by each computer comprises:

(a) an agent base, said agent base having:

(a1) a shell agent responsive to an input of a script language controlling the distributed application to interpret and execute said script language;

(a2) a local service agent furnishing information of a local file system to said computer; and (a3) an application agent controlling the application;

(a4) said agent base furnishing respective fields of execution to said shell agent, local service agent and the application agent;

(b) agent mover furnishing the function of causing an agent to move to an agent base of at least one other computer;

(c) a remote call module furnishing functions for an agent to have communication with an agent of an own computer or at least one other computer; and (d) agent generator generating an application agent; and (e) wherein execution of the application distributed over each computer is controlled responsive to an input of said script language.

2. The distributed application control system as defined in claim 1 wherein said shell agent includes:

a current directory supervising a current directory in executing the script language; and a shell interpreter having syntax analyzer analyzing the syntax of said script language and command analysis—executor analyzing and executing a command; and wherein when said current directory indicates an agent base on a remote controller, said shell agent itself is moved by said agent mover to said remote controller to execute an application agent.

3. The distributed application control system as defined in claim 2 wherein said shell agent further includes a status table for supervising the status of an agent;

said status table has a parallel execution counter for an agent and a terminal execution flag; and wherein if, when the current base of said current directory is a remote computer, the status of the agent is not the parallel execution nor the terminal execution mode, said shell agent is moved to said remote computer.

4. The distributed application control system as defined in claim 2 further comprising:

means for invoking a local service agent assisting each computer to access local resources for generating an application agent by said shell agent;

wherein when said application agent is generated, said shell agent generates the application agent through said local service agent instead of directly invoking said agent generator.

5. The distributed application control system as defined in claim 2 wherein said shell agent further includes an agent referencing table; and wherein a request for movement or command execution is made to an application agent stored in said agent referencing table and booted outside.

6. The distributed application control system as defined in claim 1 wherein said shell agent further includes a repository path table of an agent; and wherein the application agent is retrieved from the repository path and executed.

7. The distributed application control system as defined in claim 1 wherein said application agent includes application booting means dependent on said computer; and wherein said application is generated and supervised under commands by said shell agent.

8. The distributed application control system as defined in claim 1 wherein said application agent includes means for referencing an extension-application associating table to select an application to be booted depending upon the sort of the file extension;

said selected application being generated and supervised under a command of said shell agent.

9. The distributed application control system as defined in claim 1 wherein said agent platform further includes thread generator; and wherein if parallel execution is specified in the input script language, as many threads as are required for executing said script language are generated to control the parallel execution of the application.

10. The distributed application control system as defined in claim 9 wherein said agent platform includes a sub-shell agent in an agent base of said remote controller when generating an application agent in said remote computer by the generated thread;

said sub-shell agent taking over the role of generating said application agent.

11. A method for controlling the distributed application in a system in which a plurality of computers are interconnected over a network, wherein the method comprises the steps of:

(a) interpreting and executing a script language input to control a distributed application by a shell agent in each agent platform of each computer;

(b) furnishing information pertinent to a local file system to said computer by a local service agent;

(c) controlling the application by an application agent;

(d) furnishing, by an agent base, respective fields of execution for said shell agent, local service agent and said application agent;

(e) allowing said agent to be movable to at least one other agent base of at least one other computer through an agent movement mechanism;

(f) allowing said agent to communicate with an own computer or at least one other computer through a remote call function;

(g) interpreting, by said shell agent, an input script language to control the generation of the application agent through an agent generating function; and (h) executing the distributed applications in said computers under control responsive to inputting of said script language.

12. The method for controlling the distributed application as defined in 11 wherein said shell agent supervises a current directory in executing the script language, said shell agent also analyzing and executing the application distributed across said computers; and wherein when the current directory indicates an agent base on a remote computer, the shell agent itself is moved to said remote computer to execute the application agent.

13. The method for controlling the distributed application as defined in claim 11 wherein said shell agent further references a repository path table of said agent to retrieve the application agent from a repository path table to execute the retrieved application agent.

14. The method for controlling the distributed application as defined in claim 11 wherein
said shell agent uses information of a terminal execution flag and the parallel execution count of an agent of a status table supervising the agent status and, if a current base of said current directory is a remote computer, the agent status being not a parallel executing status nor a terminal execution mode, the shell agent is moved to the remote computer.

15. The method for controlling the distributed application as defined in claim 11 wherein, in generating an application agent, the shell agent does not invoke the agent generating function, with the application agent being generated through a local service agent assisting each computer to access local resources.

16. The method for controlling the distributed application as defined in claim 11 wherein
said shell agent has an agent referencing table and makes request for movement or command execution to an application agent stored in said agent referencing table and booted outside.

17. The method for controlling the distributed application as defined in claim 11 wherein
said application agent has a function of computer-dependent booting of an application and generates said application under a command of said shell agent to supervise the so-generated application.

18. The method for controlling the distributed application as defined in claim 11 wherein
said application agent uses an extension application accommodating table provided in each computer to select an application booted depending on the sort of file extensions, said application agent generating and supervising said generated application under a command of said shell agent.

19. The method for controlling the distributed application as defined in claim 11 wherein
said agent platform has the function of generating a thread and wherein
when the input script language has a description on the parallel execution, there are generated threads necessary for parallel execution to control the parallel execution of the application.

20. The method for controlling the distributed application as defined in claim 11 wherein
when said agent platform generates an agent platform in a remote computer by a generated thread, a sub-shell agent is generated in an agent base in the remote computer, said sub-shell agent taking over the role of application agent generation.

21. In a distributed application control system in which a plurality of computers are interconnected over a network,
a computer readable program product configured for operating a shell agent, local service agent, application agent, agent base, agent mover, remote call module and agent generator on said computers,
said program product comprising commands operating said control system;
said control system comprising:
(a) an agent platform of each computer having a shell agent fed with a script language for controlling distributed applications as input to interpret and execute the script language,
(b) a local service agent providing the computer with information comprising local file system,
(c) an application agent controlling an application,
(d) an agent base furnishing a field of execution to said shell agent, local service agent and the application agent,
(e) agent mover furnishing to an agent a function of agent movement to another agent base of at least one other computer,
(f) a remote call module providing the agent with a function of communicating with an own computer or with another agent of at least one other computer, and
(g) agent generator furnishing a function of generating an application agent, and in which the control system controls the execution of distributed applications in said computers.

22. In a distributed application control system in which a plurality of computers are interconnected over a network,
a computer accessible medium carrying thereon a program for operating a shell agent, local service agent, application agent, agent base, agent mover, remote call module and agent generator on said computers,
said program comprising commands operating said control system,
said control system comprising:
(a) an agent platform of each computer having a shell agent fed with a script language for controlling distributed applications as input to interpret and execute the script language,
(b) a local service agent providing the computer with information comprising a local file system,
(c) an application agent controlling an application,
(d) an agent base furnishing a field of execution to said shell agent, local service agent and the application agent,
(e) agent mover furnishing to an agent a function of agent movement to another agent base of at least one other computer,
(f) a remote call module providing the agent with a function of communicating with an own computer or with another agent of at least one other computer, and
(g) agent generator furnishing a function of generating an application agent, and in which the control system controls the execution of distributed applications in said computers.

23. A computer connected to one or more other computers over a network, said computer comprising:
an agent platform, a file system local to said computer, an application and an agent repository;
said agent platform including:
(a) an input unit receiving an input to said computer, an output unit issuing an output from said computer,
(b) a shell agent interpreting and executing an input script language to generate an application agent and to have communication,
(c) a local service agent, as an agent for providing said computer with inherent information or functions, said local service agent supervising a local file system to provide the shell agent with information,
(d) an application agent executing a given task on request from said shell agent;
(e) an agent base furnishing an area for storage of an agent program being executed on each agent;
(f) an agent movement module providing an agent in said agent base with a function of movement to another agent platform;

(g) a thread generating unit furnishing a function of generating a new thread when an agent in an agent base is operated in a multi-thread operation;

(h) a remote call module providing an agent in said agent base with a function of invoking a method from another agent in said agent base or an agent of another agent platform; and (i) an agent generating module invoked in generating a new agent in said agent base and executing the generated agent, said agent generating module referencing said agent repository to retrieve an agent program to generate a new agent in said agent base based on the retrieved result;

wherein said script language input through said input unit is interpreted by said shell agent to boot said application agent, said application agent supervising an actual application;

said shell agent and the application agent being movable to at least one other computer through said network, using said agent movement module, said shell agent being able to communicate with an agent in at least one other computer through said network.

24. The computer as defined in claim 23 wherein a shell interpreter in said shell agent is fed from said input unit with a script language and interprets the input script language, said shell interpreter executing the parallel processing if the script language is a parallel execution sentence; and wherein if the script language can be processed as an internal command, said shell interpreter performs control to effect parallel processing, whereas, if otherwise, said shell interpreter performs control to effect external command processing.

25. The computer as defined in claim 23 in which said shell agent includes a shell interpreter having a syntax analysis unit responsive to an input of a script language from said input unit to interpret the input script language and a command analysis—executing unit for executing a command, a status table for supervising the state of execution of said shell agent, and a current directory storage unit for memorizing the current directory of said shell agent;

wherein said syntax analysis unit referencing a keyword table having a keyword registered thereon, said syntax analysis unit when receiving an input having a syntax beginning with a keyword of a parallel executing sentence requesting said thread generating unit to generate a new thread to effect parallel execution;

said command analysis—executing unit verifies whether or not an input command is an internal command that can be processed in said shell agent; if, as a result of verification, the input command is the internal command, a command definition is loaded from an internal command definition storage unit, memorizing the internal command definition, to execute the command definition; said agent movement unit being invoked if, in executing a directory movement command from among internal commands loaded from the internal command definition storage unit, movement of said shell agent itself is necessary;

said remote call module being utilized if a method of another agent is executed;

the result of command execution by said command analysis—executing unit being delivered to said output unit and output from said computer;

an agent program for executing an external command being retrieved from an agent repository in an external command execution unit provided in said shell agent in case of execution of an external command; a repository path table being referenced to determine which path in said agent repository is to be retrieved or not to sequentially retrieve the agent repository for paths stored in said repository path table;

wherein if, as a result of retrieval of said agent repository, the necessary agent is retrieved, said external command execution unit requests the agent generating unit to generate an agent, said agent generating unit so-requested then generating an application agent; and wherein when making a method call to an agent other than said shell agent, said external command execution unit invokes said remote call module.

26. The computer as defined in claim 25 wherein said local service agent receives an external command name and the path information stored in said repository path table from said external command execution unit to retrieve said agent repository and to invoke an actual agent generating unit to generate said application agent.

27. The computer as defined in claim 25 wherein said external command execution unit checks whether or not the current base stored in said current directory storage unit actually is coincident with the current base actually executing the shell agent; in case of coincidence, said external command execution unit checks whether or not a program of an application agent in question is present in an agent repository path of the agent repository being executed in order to generate an external application agent in the base being executed; if there is such program of the application agent, the external command execution unit asks said agent generating unit to load the application agent program from the agent repository to execute the application agent;

in case of non-coincidence of the current base stored in said current directory storage unit with the base currently executing the shell agent, said remote call module is used to generate a sub-shell agent in said current base; and wherein it is checked whether or not there is a program of an application agent in question in an agent repository path of the agent repository of the current base in said sub-shell agent; in case such program of said application agent exists, the program of the application agent from said agent repository is loaded to ask the agent generating unit to load the application agent program from said agent repository to execute the application agent.

28. The computer as defined in claim 25 wherein, if said internal command is a command indicating directory movement, the directory of destination of movement is extracted from said internal command to develop the extracted directory of destination of movement in a directory constituent element to store the base name and the directory in a base in a current base of the directory storage table and in an in-base directory, respectively;

the value of a parallel execution counter for storage of depth information of parallel execution, provided in said status table, is checked as to whether or not it is equal to 0; if the parallel execution counter is other than 0, it indicates that the shell agent is executing in parallel; the value of said current directory storage unit is updated to the value of the directory of the destination of movement specified by a command representing said directory movement, with the shell agent not being moved between computers;

if the parallel execution counter is 0, the shell agent is executing in a sole thread, so a terminal mode flag, provided in said status table, and which is set to a first value and to a second value if the shell agent is being executed as a shell awaiting an input from a terminal and if the shell agent is being executed as a batch command without being connected to a specified terminal, respectively, is referenced, with movement between computers of the shell agent by a command representing the directory command not being made, but only the updating of the value of the current directory storage unit being made, when said terminal mode flag is of the first value; and wherein if said terminal mode flag is of a second value, the batch mode is being executed, so that the value of the current directory storage unit and the directory of destination of movement are compared to each other; if the current directory storage unit and the directory of destination of movement are on the same computer, value of the current directory storage unit is updated, if the current directory storage unit and the directory of the destination of movement are on the same computer, said shell agent is moved in a controlled manner to an agent base of a computer where there exists a current base of the directory of destination of movement.

29. The computer as defined in claim 23 wherein in detecting a parallel execution sentence to execute the parallel execution processing in a syntax analysis unit of said shell interpreter, a parallel execution counter of said status table is incremented by one to record that the shell agent is currently in parallel executing state;

as many threads as there are commands in said parallel executing sentence are generated by said thread generating unit;

the generated number of threads is recorded and set in a thread variable;

the commands in said parallel executing sentence are executed in parallel in respective threads;

on completion of the execution of the respective threads, the number of values of thread variables is decremented by one, with the number of said threads being zero at a time point of end of all threads to terminate parallel execution; and wherein the value of said parallel execution counter is decremented by one to terminate the execution of the entire parallel execution.

30. The computer as defined in claim 23 wherein it is checked whether or not the current base stored in said current directory storage unit coincides with the executing base actually executing the shell agent; in case of coincidence, said local service agent of the executing base is asked to execute the external agent to generate the external application agent in the executing base;

said local service agent checks whether or not there is a program of an application agent in question in an agent repository path of an agent repository of a base in execution; if there is any such program of the application agent, said local service agent asks the agent generating unit to load the application agent program from the agent repository to execute the application agent;

in case of non-coincidence between the current base stored in the current directory storage unit with the base in execution actually executing the shell agent, said local service agent uses said remote call module to ask the local service agent to execute the external agent; and wherein said local service agent checks whether or not there is any program of an application agent in question in an agent repository path of the agent repository of the current base; if there is any such program of the application agent, said local service agent asks the agent generating unit to load the program of the application agent from the agent repository to execute the application agent.

31. The computer as defined in claim 23 wherein there is provided a general-purpose application agent as said application agent; an extension application accommodating table memorizing and holding the relation between an extension and the application corresponding to said extension is referenced and retrieved from the extension of a designated file to boot an application having an extension coincident with the extension of the designated file.

* * * * *